(12) United States Patent
Tochigi et al.

(10) Patent No.: US 12,707,166 B2
(45) Date of Patent: Aug. 11, 2026

(54) SOLID-STATE IMAGING ELEMENT AND IMAGING DEVICE

(71) Applicant: SONY SEMICONDUCTOR SOLUTIONS CORPORATION, Kanagawa (JP)

(72) Inventors: Yasuhisa Tochigi, Kanagawa (JP); Yusuke Matsumura, Kanagawa (JP); Fumiaki Sano, Kanagawa (JP); Katsuhiko Hanzawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 126 days.

(21) Appl. No.: 18/690,390

(22) PCT Filed: Jun. 9, 2022

(86) PCT No.: PCT/JP2022/023223
§ 371 (c)(1),
(2) Date: Mar. 8, 2024

(87) PCT Pub. No.: WO2023/042498
PCT Pub. Date: Mar. 23, 2023

(65) Prior Publication Data

US 2024/0380998 A1 Nov. 14, 2024

(30) Foreign Application Priority Data

Sep. 17, 2021 (JP) ................................ 2021-152305

(51) Int. Cl.
*H04N 25/77* (2023.01)
*H04N 23/80* (2023.01)
(Continued)

(52) U.S. Cl.
CPC ............. *H04N 25/77* (2023.01); *H04N 23/80* (2023.01); *H04N 25/78* (2023.01); *H04N 25/11* (2023.01)

(58) Field of Classification Search
CPC ........ H04N 25/77; H04N 25/11; H04N 25/78; H04N 25/59; H04N 23/80; H10F 39/18; H10F 39/803
See application file for complete search history.

(56) References Cited

U.S. PATENT DOCUMENTS 10,986,986 B2 * 4/2021 Hanzawa ............... H04N 25/77
11,711,634 B2 * 7/2023 Zhu ........................ H04N 25/47
(Continued)

FOREIGN PATENT DOCUMENTS

JP 53-3018 A 1/1978
JP 2011139350 A * 7/2011 ............. H04N 25/00
(Continued)

OTHER PUBLICATIONS

International Search Report and Written Opinion of PCT Application No. PCT/JP2022/023223, issued on Sep. 6, 2022, 10 pages of ISRWO.

*Primary Examiner* — Marly S Camargo
(74) *Attorney, Agent, or Firm* — CHIP LAW GROUP

(57) ABSTRACT

Provided are a solid-state imaging element and an imaging device that include a plurality of pixel regions that include a plurality of pixels, and a plurality of first charge storage units corresponding to the respective pixel regions, wherein a plurality of first pixels in the pixel region each include a photoelectric conversion unit, and a first element that is brought into a conductive state or a non-conductive state with a photoelectric conversion unit of a pixel adjacent in at least one of vertical and horizontal directions, and a second pixel in the pixel region includes a photoelectric conversion unit, and a first element that is brought into a conductive
(Continued)

state or a non-conductive state with a photoelectric conversion unit of a pixel adjacent to the first pixel in at least one of vertical and horizontal directions, and a first charge storage element.

25 Claims, 26 Drawing Sheets

(51) Int. Cl.

| | |
|---|---|
| ***H04N 25/11*** | (2023.01) |
| ***H04N 25/78*** | (2023.01) |
| ***H10F 39/18*** | (2025.01) |

(56) References Cited

U.S. PATENT DOCUMENTS

| | | | | |
|---|---|---|---|---|
| 2015/0028189 | A1* | 1/2015 | Hagiwara | H10F 39/80373<br>250/208.1 |
| 2020/0137325 | A1* | 4/2020 | Mori | H04N 25/771 |
| 2021/0360182 | A1* | 11/2021 | Zhu | H04N 25/47 |

FOREIGN PATENT DOCUMENTS

| | | | |
|---|---|---|---|
| JP | 2014-232900 | A | 12/2014 |
| JP | 2015-023250 | A | 2/2015 |
| JP | 2019-519793 | A | 7/2019 |
| WO | 2017/169216 | A1 | 10/2017 |

* cited by examiner

CHARGES OF PD13
TRANSFERRED TO FD

| 1 | 5 | 1 |
|---|---|---|
| 5 | 5 | 5 |
| 1 | 5 | 1 |

SOLID-STATE IMAGING ELEMENT AND IMAGING DEVICE

CROSS REFERENCE TO RELATED APPLICATIONS

This application is a U.S. National Phase of International Patent Application No. PCT/JP2022/023223 filed on Jun. 9, 2022, which claims priority benefit of Japanese Patent Application No. JP 2021-152305 filed in the Japan Patent Office on Sep. 17, 2021. Each of the above-referenced applications is hereby incorporated herein by reference in its entirety.

TECHNICAL FIELD

The present disclosure relates to a solid-state imaging element and an imaging device.

BACKGROUND ART

Processing of image data captured by a solid-state imaging element is generally performed by a device external to the solid-state imaging element. If basic operations for image processing such as a convolution operation are performed by a solid-state imaging element of an imaging device, it provides faster cooperation with external equipment, improving the convenience for users.

CITATION LIST

Patent Literature

[PTL 1]
Japanese Patent Application No. 2019-519793

SUMMARY

Technical Problem

On the other hand, if operational processing such as a convolution operation is performed on a solid-state imaging element of an imaging device, it may result in an increase in the size of the solid-state imaging element.

Therefore, the present disclosure provides a solid-state imaging element and an imaging device that are capable of performing operational processing while suppressing an increase in the size of the solid-state imaging element.

Solution to Problem

In order to solve the above problem, according to the present disclosure, a solid-state imaging element is provided, including:

a plurality of pixel regions that include a plurality of pixels; and a plurality of first charge storage units corresponding to the respective pixel regions, wherein a plurality of first pixels in the pixel region each include a photoelectric conversion unit, and a first element that is brought into a conductive state or a non-conductive state with a photoelectric conversion unit of a pixel adjacent in at least one of vertical and horizontal directions, and a second pixel in the pixel region includes a photoelectric conversion unit, and a first element that is brought into a conductive state or a non-conductive state with a photoelectric conversion unit of a pixel adjacent to the first pixel in at least one of vertical and horizontal directions, and a first charge storage element that is brought into a conductive state or a non-conductive state with the first charge storage unit.

The first element and the first charge storage element in the pixel region may be brought into a first non-conductive state to start photoelectric conversion in the photoelectric conversion unit.

After a photoelectric conversion period of the photoelectric conversion unit ends, the first element that is brought into a conductive state or a non-conductive state with another photoelectric conversion unit in the pixel region may be brought into a first conductive state.

After the first conductive state, the first charge storage element may be brought into a second conductive state.

After the first conductive state, the first element that is brought into a conductive state or a non-conductive state with the other photoelectric conversion unit in the pixel region may be further brought into a second non-conductive state, and the first charge storage element may be brought into a third conductive state.

Accumulated charges resulting from photoelectric conversion for each of the pixel regions may be transferred through each of the first elements to the corresponding first charge storage unit.

The pixel may include a potential adjustment element that is connected between the photoelectric conversion unit and the first element, and the accumulated charges may be transferred by the potential adjustment element and the first element.

A photoelectric conversion period of the photoelectric conversion unit may be controlled according to a weight value of operational processing.

The pixel may further include a second element that discharges accumulated charges of the photoelectric conversion unit, and a non-discharge period of the accumulated charges by the second element may be controlled according to the weight value.

The pixel region may be changeable for the corresponding first charge storage unit.

A range of the pixel region for the first charge storage unit may be changed depending on a calculation range of operational processing.

The plurality of pixels may be arranged in a matrix, and the first element may either bring a connection between the photoelectric conversion units adjacent in a first direction into a conductive state or a non-conductive state or bring a connection between the photoelectric conversion units adjacent in a second direction different from the first direction into a conductive state or a non-conductive state.

The first element may be a transfer transistor that has one end connected to the photoelectric conversion unit and is brought into a conductive state or a non-conductive state by a positive voltage control signal.

The photoelectric conversion unit and the first element may be formed in different layers.

The first charge storage unit may be a floating diffusion portion.

A third element that is electrically connected to the first element that is a predetermined one in the pixel region;

a fourth element that is electrically connected to the first charge storage unit;

a fifth element that is electrically connected to the third element; and a sixth element that resets charges accumulated in the first charge storage unit may be further included.

A second accumulation unit that accumulates accumulated charges resulting from photoelectric conversion for each pixel region; and a seventh element that electrically connects the first charge storage unit and the second accumulation unit may be further included.

An analog-to-digital conversion unit that is electrically connected to the fifth element and converts the accumulated charges resulting from photoelectric conversion for each pixel region into corresponding digital data may be further included.

Each of the pixels included in the pixel region may receive light through one of a plurality of color filters, and before accumulated charges corresponding to a predetermined color filter of the plurality of color filters are transferred to the first charge storage unit, accumulated charges corresponding to another color filter of the plurality of color filters may be discharged.

The photoelectric conversion unit may be made from at least one of silicon, indium gallium arsenide, and organic germanium.

The first to sixth elements may be made from at least one of silicon, an oxide semiconductor, and an organic semiconductor.

An accumulation control circuit may be further included that controls according to operational processing at least one of reset of accumulated charges of each of the photoelectric conversion units, generation of accumulated charges according to a weight value, the pixel region, and a potential shape.

In order to solve the problem, according to the present disclosure,

An imaging device is provided, including:

the solid-state imaging element; and an operational processing unit that is capable of performing a convolution operation, wherein the weight value and information on the pixel region corresponding to a calculation range are supplied from the operational processing unit.

The operational processing unit may calculate a difference between first digital data generated by the analog-to-digital conversion unit after control of a photoelectric conversion period of the photoelectric conversion unit according to a positive weight value of the operational processing and transfer to the first charge storage unit and second digital data generated by the analog-to-digital conversion unit after control of a photoelectric conversion period of the photoelectric conversion unit according to an absolute value of a negative weight value of the operational processing and transfer to the first charge storage unit.

DESCRIPTION OF EMBODIMENTS

Hereinafter, embodiments of a solid-state imaging element and an imaging device will be described with reference to the drawings. Although main constituent parts of an imaging sensor and an imaging device will be mainly described below, the solid-state imaging element and the imaging device may include constituent parts and functions that are not illustrated or described. The following description does not exclude constituent parts and functions that are not illustrated or described.

First Embodiment

Figure 1:
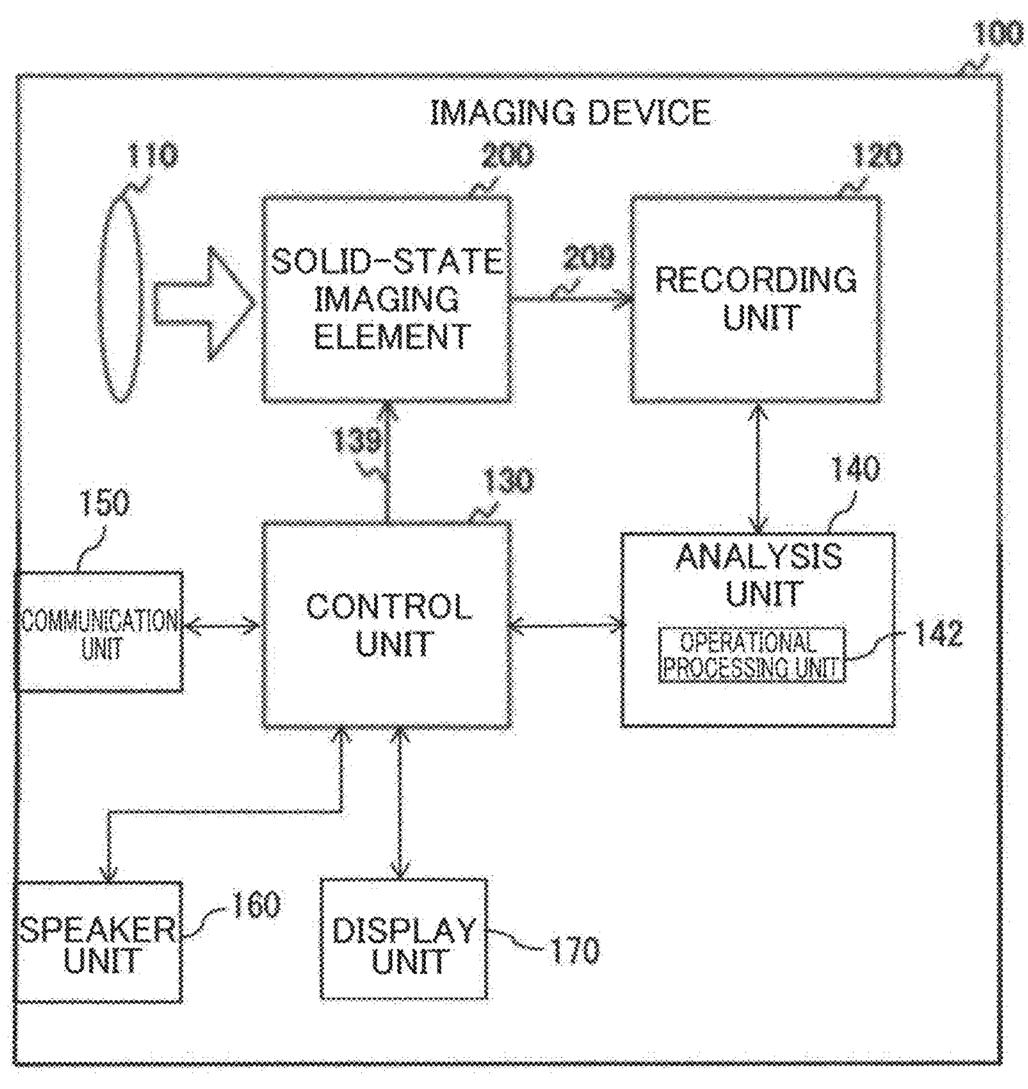
FIG. 1 is a block diagram illustrating a configuration example of an imaging device according to an embodiment of the present technology.

FIG. 1 is a block diagram illustrating a configuration example of an imaging device 100 according to an embodiment of the present technology. This imaging device 100 includes an imaging lens 110, a solid-state imaging element 200, a recording unit 120, a control unit 130, an analysis unit 140, a communication unit 150, and a speaker unit 160. The imaging device 100 is, for example, a smartphone, a mobile phone, a personal computer (PC), or the like.

The imaging lens 110 collects and guides incident light to the solid-state imaging element 200. The solid-state imaging element 200 has a plurality of gradation pixels. The gradation pixel outputs a luminance signal corresponding to an amount of light received. The solid-state imaging element 200 is capable of weighted addition of luminance signals of a plurality of gradation pixels, for example. Hereinafter, the gradation pixel may be referred to as a pixel.

The solid-state imaging element 200 can perform predetermined signal processing such as weighted addition for an analog signal, and outputs the processed data to the recording unit 120 via a signal line 209.

The recording unit 120 records, for example, data from the solid-state imaging element 200. The control unit 130 controls the entire imaging device 100. The control unit 130 controls the solid-state imaging element 200 to capture image data.

The analysis unit 140 includes an operational processing unit 142. The operational processing unit 142 is capable of performing operational processing such as a convolution operation, for example. The analysis unit 140 performs predetermined analysis processing, image processing, and the like using, for example, the calculation results of the operational processing unit 142. For example, operational processing such as a convolution operation performed by the operational processing unit 142 is performed for an analog signal by the solid-state imaging element 200, and subsequent operational processing is performed by the operational processing unit 142.

The communication unit 150 performs wireless communication with an external device. As a result, content and others are received from an external server and recorded in the recording unit 120 through the control unit 130. The control unit 130 causes a display unit 170 to display an image based on this content, for example.

The speaker unit 160 includes a highly directional speaker, which can transmit sound information only to the user. This speaker unit 160 can change the direction in which sound is transmitted.

Figure 2:
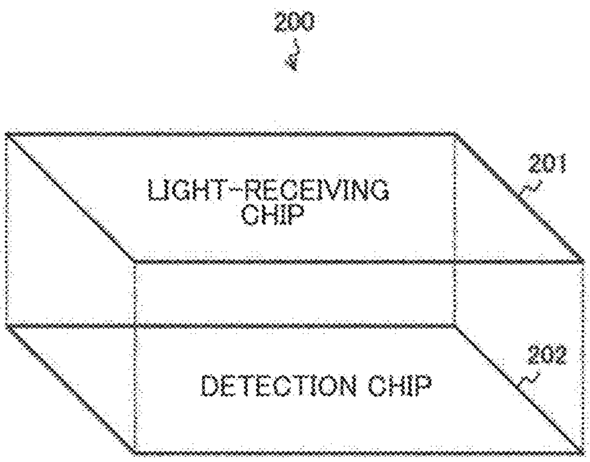
FIG. 2 is a diagram illustrating an example of a laminated structure of a solid-state imaging element.

FIG. 2 is a diagram illustrating an example of a laminated structure of the solid-state imaging element 200 according to the embodiment of the present technology. The solid-state imaging element 200 includes a detection chip 202 and a light-receiving chip 201 laminated on the detection chip 202. These substrates are electrically connected through connection parts such as vias. Instead of the vias, the chips may also be connected by Cu—Cu bonding or bumps.

Figure 3:
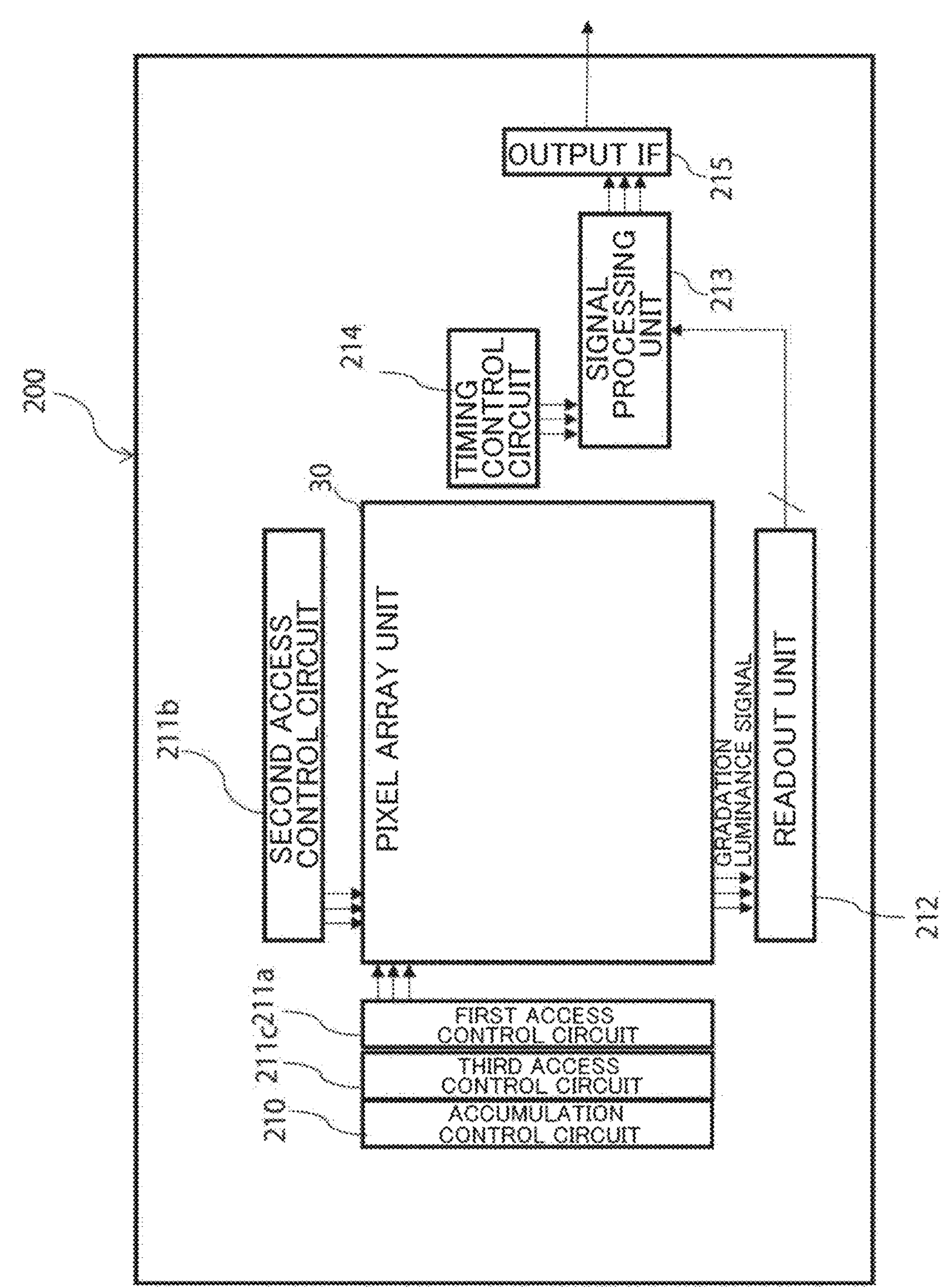
FIG. 3 is a block diagram illustrating a configuration example of a solid-state imaging element.

FIG. 3 is a block diagram illustrating a configuration example of the solid-state imaging element 200. As illustrated in FIG. 3, the solid-state imaging element 200 according to the present disclosure includes a pixel array unit 30, an accumulation control circuit 210, a first access control circuit 211*a*, a second access control circuit 211*b*, a third access control circuit. 211*c*, a readout unit 212, a signal processing unit 213, a second signal processing unit 214, a timing control circuit 214, and an output interface 215.

Figure 4:
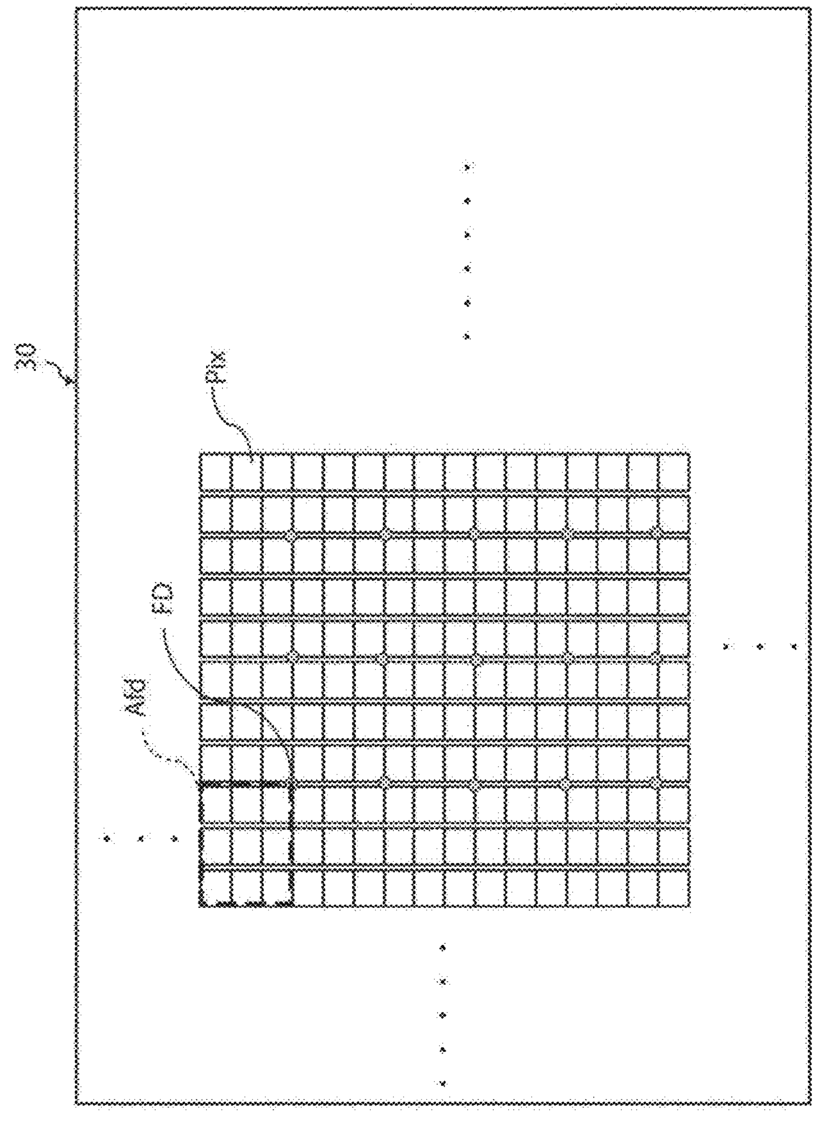
FIG. 4 is a diagram schematically illustrating pixels arranged in a matrix in a pixel array unit.

The configuration of the pixel array unit 30 will now be described based on FIG. 4. FIG. 4 is a diagram schematically illustrating pixels Pix arranged in a matrix in the pixel array unit 30. As illustrated in FIG. 4, in the pixel array unit 30, a plurality of pixels Pix are two-dimensionally arranged in a matrix (array). One floating diffusion FD is arranged for a processing region Afd corresponding to a predetermined number of pixels Pix. The pixel Pix, the processing region Afd, and the floating diffusion FD will be described later. The pixels Pix are formed in the layer of the light-receiving chip 201. On the other hand, elements, such as switching elements TR1 to T3, switching elements TRG, RST, switching elements RST, AMP, SEL, and FG, which will be described later, are formed in the detection chip 202.

The pixel array unit 30 is, for example, a CMOS image sensor. For example, the processing region Afd corresponds to the addition range for the floating diffusion FD, which will be described later with reference to FIGS. 12A, 12B, 12C, 13, and 14. This configuration example of the pixel array unit 30 is suitable for, for example, a 3×3 weighting filter, but is not limited thereto.

As illustrated in FIG. 3 again, the accumulation control circuit 210 controls the photoelectric conversion unit of each pixel Pix. Specifically the accumulation control circuit 210 can control the reset of the accumulated charges of each of the plurality of photoelectric conversion units, the generation of accumulated charges according to a weight value, the potential shape of the photoelectric conversion unit, and the like. The photoelectric conversion unit will also be described later.

The first access control circuit 211*a* can perform control to sequentially move the accumulated charges accumulated in each of the plurality of pixels Pix row by row. The second access control circuit 211*b* can perform control to sequentially move the accumulated charges accumulated in each of the plurality of pixels Pix column by column.

The third access control circuit 211*c* controls the reset of the accumulated charges of the floating diffusion FD, the accumulation of the floating diffusion FD, and the amplification of a luminance signal corresponding to the accumulated charges of the floating diffusion FD. Details of control examples of the first access control circuit 211*a*, the second access control circuit 211*b*, and the third access control circuit 211*c* will also be described later.

Figure 5:
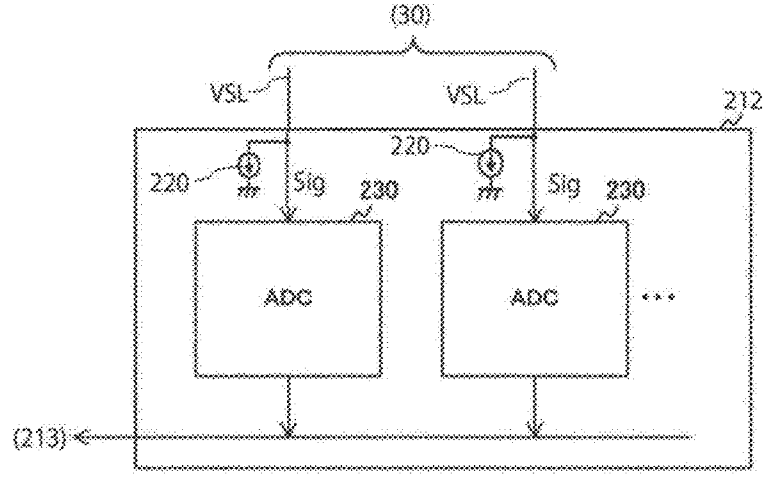
FIG. 5 is a diagram illustrating a configuration example of a readout unit.

A configuration example of the readout unit 212 will be described based on FIG. 5. FIG. 5 is a diagram illustrating a configuration example of the readout unit 212. The readout unit 212 includes a plurality of constant current sources 220 and a plurality of analog-to-digital conversion units ADC 230. The plurality of constant current sources 21 and the plurality of AD conversion units ADC 230 are provided corresponding to a plurality of signal lines VSL, respectively.

One end of the constant current source 21 is connected to the corresponding signal line VSL, and the other end is grounded. This constant current source 21 generates for the corresponding signal line VSL a current corresponding to the accumulated charges of the selected floating diffusion FD (see FIG. 4) as an image luminance signal Sig.

The AD conversion unit ADC 230 is configured to perform AD conversion based on the signal Sig on the corresponding signal line VSL. Specifically the AD conversion unit ADC 230 converts the analog gradation luminance signal Sig supplied via the vertical signal line VSL into a digital signal in a time-division manner. This AD conversion unit ADC 230 supplies the generated digital signal to the signal processing unit 213.

As illustrated in FIG. 3 again, the signal processing unit 213 performs predetermined signal processing on the digital signal from the readout unit 212. This signal processing unit 213 supplies data indicating the processing result and a detection signal to the recording unit 120 via the signal line 209.

The timing control circuit 214 controls the timing for each part of the solid-state imaging element 200 based on time stamp information. For example, the timing control circuit 212*d* controls processing timings for the accumulation control circuit 210, the first access control circuit 211*a*, the second access control circuit 211*b*, the third access control circuit 211*c*, the readout unit 212, and the signal processing unit 213. The output interface 215 outputs image data, which is the digital signal supplied from the signal processing unit 213, to the recording unit 120.

Figure 6:
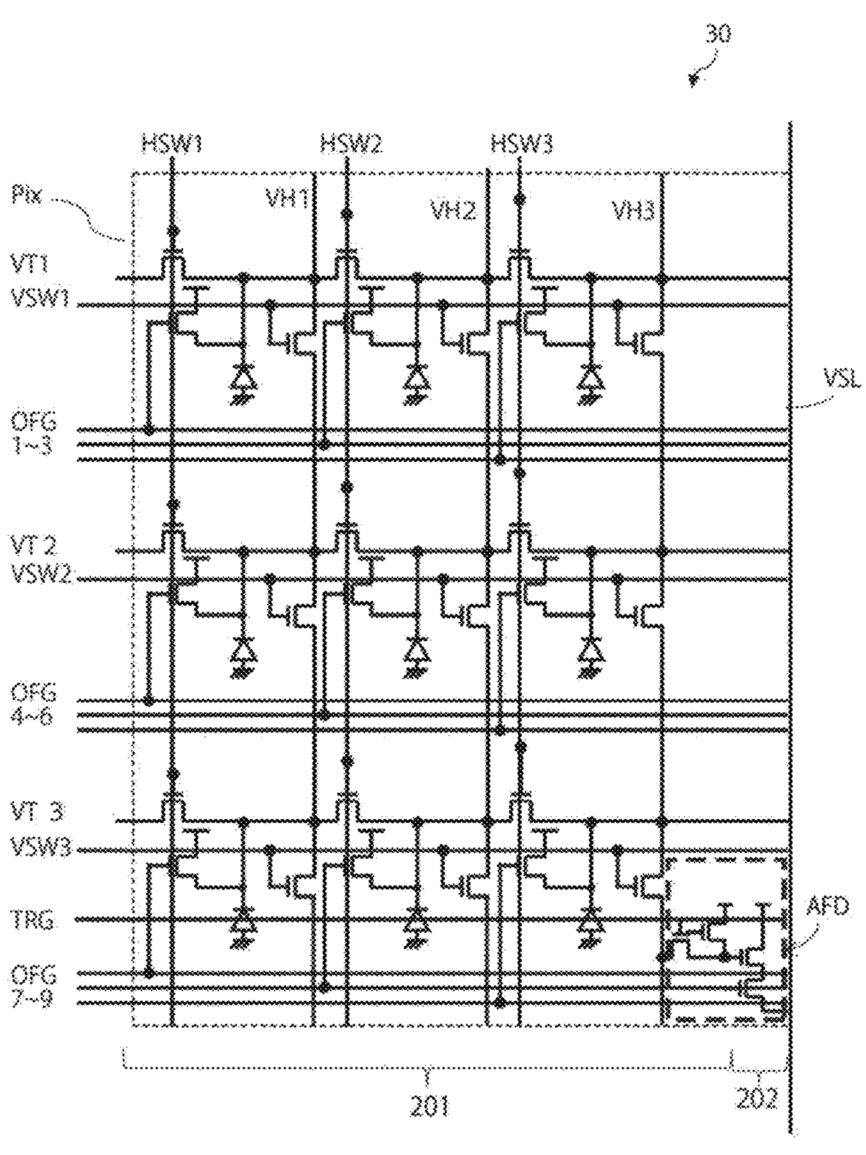
FIG. 6 is a diagram illustrating a configuration example of the pixel array unit.
Figure 7:
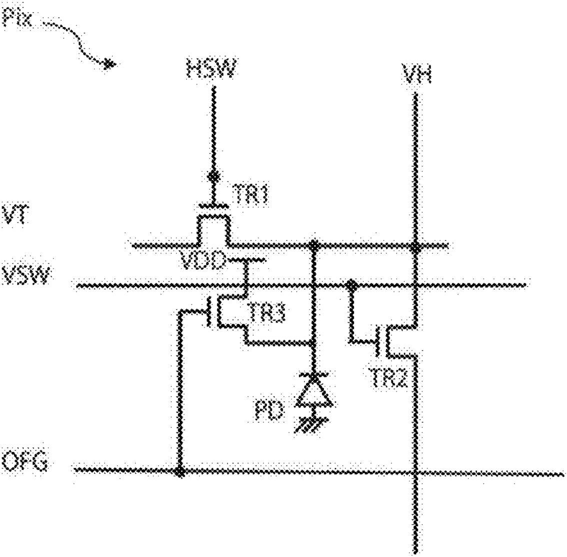
FIG. 7 is a diagram illustrating a configuration of a pixel.

A detailed configuration example of the pixel array unit 30 will now be described based on FIGS. 6 to 10. FIG. 6 is a diagram illustrating a configuration example of the pixel array unit 30. For example, this is a configuration example of 3×3 pixels Pix in the upper left of the FD in FIG. 4. FIG. 7 is a diagram illustrating a configuration example of a pixel Pix. As illustrated in FIG. 7, the pixel Pix includes switching elements TR1 to TR3 and a photoelectric conversion unit PD. As described above, the photoelectric conversion unit PD, the floating diffusion FD, and the switching elements TR1 to T3 and TRG are formed in the layer of the light-receiving chip 201. On the other hand, elements, such as switching elements TRST, AMP, SEL, and FG (see FIGS. 10 and 18) are formed in the layer of the detection chip 202. The switching element TR2 of the pixel Pix in the third row and third column according to the present embodiment corresponds to a charge storage element.

As illustrated in FIG. 6, accumulation control lines OFG1 to OFG9 connect each pixel Pix to the accumulation control circuit 210 (see FIG. 3). Horizontal control lines HSW1 to HSW3 connect pixels Pix in each row to the first access control circuit 211*a* (see FIG. 3). Pulsed control signals Hsw1 to Hsw3 are supplied to the horizontal control lines HSW1 to HSW3 from the first access control circuit 211*a* (see FIG. 3).

Vertical control lines VSW1 to VSW3 connect the pixels Pix in each column to the second access control circuit 211*b* (see FIG. 3). Pulsed control signals Vsw1 to Vsw3 are supplied to the vertical control lines VSW1 to VSW3 from the second access control circuit 211*b* (see FIG. 3).

To each of the control lines VT1 to VT3, the switching elements TR1 in the corresponding row are connected in series. To each of the control lines VH1 to VH3, the switching elements TR2 in the corresponding column are connected in series.

As illustrated in FIG. 7, the switching elements TR1 to T3 are, for example, N-type metal oxide semiconductor (MOS) transistors. One end of the switching element TR1 is connected to the other end of the left switching element TR1 adjacent thereto and one end of the left switching element TR2 adjacent thereto. The other end of the switching element TR1 is connected to one end of the right switching element TR1 adjacent thereto and one end of the switching element TR2. The gate of the switching element TR1 is connected to the horizontal control line HSW. As a result, the switching element TR1 is in a connected state (on) when the control signals Hsw1 to Hsw3 supplied via the horizontal control lines HSW1 to HSW3 are high, and is in a disconnected state (off) when the control signals are low. The switching element TR1 may be referred to as a horizontal transfer transistor. In the present embodiment, the connected state (on) of the switching element may be referred to as a conductive state, and the unconnected state (off) of the switching element may be referred to as a non-conductive state.

One end of the switching element TR2 is connected to the other end of the upper switching element TR2 adjacent thereto and the other end of the switching element TR1. The other end of the switching element TR2 is connected to one end of the lower switching element TR2 adjacent thereto and the other end of the lower switching element TR1 adjacent thereto. The gate of switching element TR2 is connected to the vertical control line VSW. As a result, the switching element TR2 is in a connected state (on) when the control signals Vsw1 to Vsw3 supplied via the horizontal control lines VSW1 to VSW3 are high, and is in a disconnected state (off) when the control signals are low. The switching element TR2 may be referred to as a vertical transfer transistor.

One end of the switching element TR3 is connected to a power supply VDD, and the other end is connected to one end of the photoelectric conversion unit PD. The gate of the switching element TR3 is connected to the accumulation control line OFG. As a result, the switching element TR3 is in a connected state (on) when a control signal Ofg supplied via the accumulation control line OFG is high, and is in a disconnected state (off) when the control signal is low. The switching element TR3 may be referred to as an OFG transistor.

Figure 8:
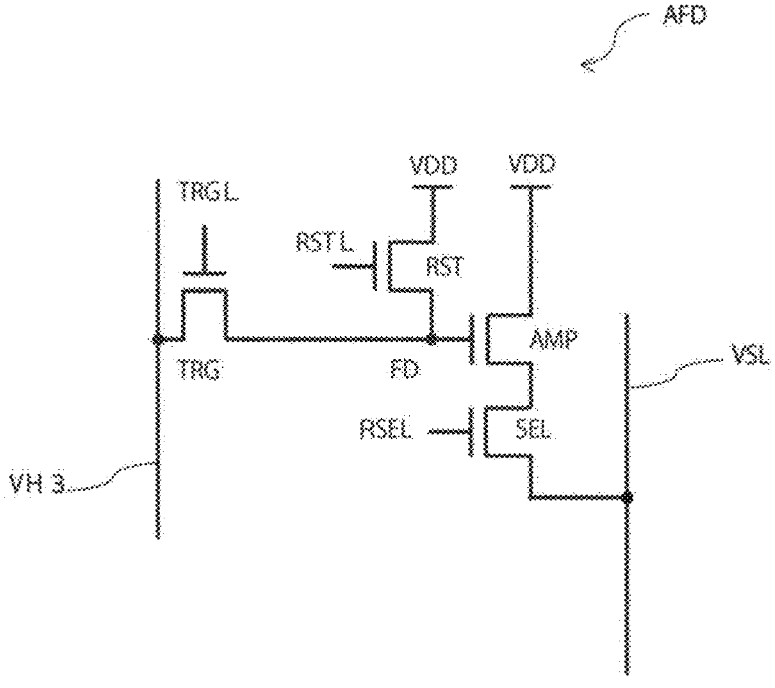
FIG. 8 is a circuit diagram illustrating a configuration example of a pixel circuit.

FIG. 8 is a circuit diagram illustrating a configuration example of a pixel circuit AFD. The pixel circuit AFD includes a control line TRGL, a control line RSTL, and a control line RSEL. One ends of the control lines TRGL, RSTL, and RSEL are connected to the third access control circuit 211*c* (see FIG. 3). Apulsed control signal Trg is supplied to the control line TRGL by the third access control circuit 211*c*. A pulsed control signal Rst is supplied to the control line RSTL by the third access control circuit 211*c*. A pulsed control signal Sel is supplied to the control line SELL by the third access control circuit 211_c_.

The pixel circuit AFD includes the four switching elements TRG, RST, AMP, and SEL, and the floating diffusion FD. The switching elements TRG, RST, AMP, and SEL are, for example, N-type metal oxide semiconductor (MOS) transistors. The floating diffusion FD is configured using, for example, a diffusion layer formed on the surface of a semiconductor substrate.

One end of the switching element TRG is connected to the signal line VH3, and the other end is connected to the floating diffusion FD. The gate of the switching element TRG is connected to the control line TRGL. As a result, the switching element TRG is in a connected state (on) when the control signal Trg supplied via the control line TRGL is high, and is in a disconnected state (off) when the control signal is low. The switching element TRG may be referred to as a transfer transistor.

One end of the switching element RST is connected to the floating diffusion FD, and the other end is connected to the power supply voltage VDD. The gate of the switching element RST is connected to the control line RSTL. As a result, the switching element RST is in a connected state (on) when the control signal Rst supplied via the control line RSTL is high, and is in a disconnected state (off) when the control signal is low. The switching element RST may be referred to as a reset transistor.

One end of the switching element AMP is connected to the power supply voltage VDD, and the other end is connected to one end of the switching element SEL. The gate of the switching element AMP is connected to the floating diffusion FD. As a result, the switching element AMP supplies a voltage signal corresponding to the accumulated charges of the floating diffusion FD to one end of the switching element SEL. The switching element AMP may be referred to as an amplifier transistor.

One end of the switching element SEL is connected to the other end of the switching element AMP, and the other end is connected to the signal line VSL. The gate of the switching element SEL is connected to the control line RSEL. As a result, the switching element SEL is in a connected state (on) when the control signal Rsel supplied via the control line RSEL is high, and is in a disconnected state (off) when the control signal is low. The switching element SEL may be referred to as a path selection transistor.

With this configuration, when the switching element RST is brought into a conductive state based on the control signal Rst, for example, the charges accumulated in the floating diffusion FD are discharged. Next, after an exposure period for each photoelectric conversion unit PD ends, when the switching element TRG is brought into a conductive state based on the control signal Trg, the floating diffusion FD accumulates charges transferred from the photoelectric conversion unit PD through the switching element TRG.

Next, when the switching element SEL is brought into a conductive state based on the control signal Sel, the pixel circuit AFD is electrically connected to the signal line VSL. As a result, the switching element AMP is connected to the constant current source 220 (see FIG. 5) of the readout unit 212, and operates as a so-called source follower. A voltage based on the voltage of the floating diffusion FD at that time is output to the ADC 230 as the image luminance signal Sig, as described above.

Figure 9:
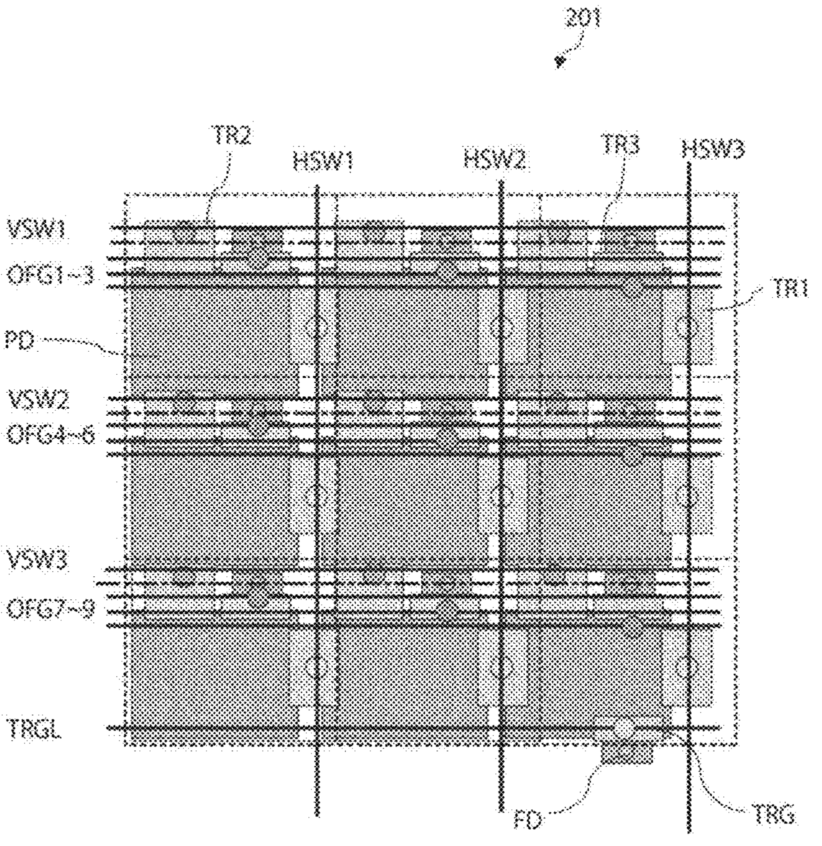
FIG. 9 is a plan view of a light-receiving chip of the pixel array unit illustrated in FIG. 6 when viewed from the back side.

FIG. 9 is a plan view of the light-receiving chip 201 of the pixel array unit 30 illustrated in FIG. 6 when viewed from the back side. As illustrated in FIG. 9, the photoelectric conversion units PD of the respective pixels Pix are arranged in a two-dimensional array. The switching elements TR1 to T3 are arranged around each photoelectric conversion unit PD. The other end of the switching element TR2 for the bottom right pixel Pix in the drawing in the 3×3 pixels Pix on the top left is connected to one end of the switching element TRG. Accordingly the accumulated charges accumulated in the photoelectric conversion unit PD of the bottom right pixel Pix in the drawing in the 3×3 pixels Pix are finally accumulated in the floating diffusion FD, and read out as the image luminance signal Sig.

Figure 10:
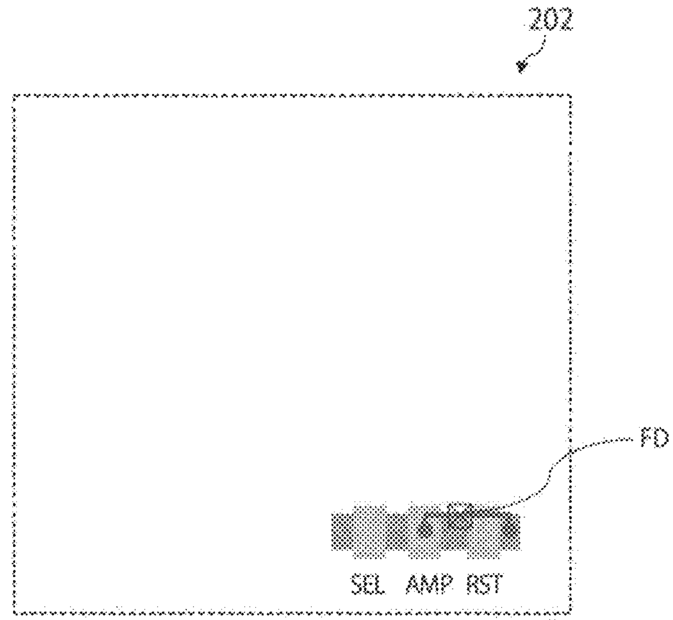
FIG. 10 is a plan view of a detection chip of the pixel circuit.

FIG. 10 is a plan view of the detection chip 202 of the pixel circuit AFD. As illustrated in FIG. 10, the switching elements SEL, AMP, and RST are formed on the detection chip 202.

Figure 11:
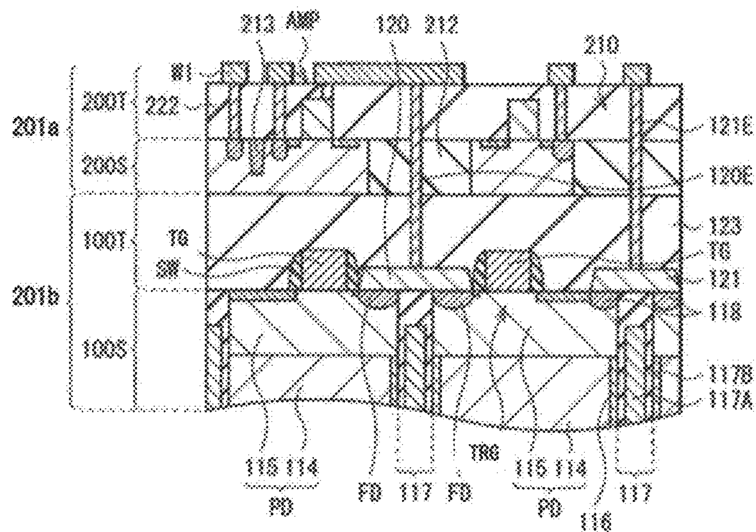
FIG. 11 is a diagram schematically illustrating a cross section of main parts of the pixel array unit.

FIG. 11 is a diagram schematically illustrating a cross section of main parts of the pixel array unit 30. As illustrated in FIG. 11, the light-receiving chip 201 (see FIG. 2) corresponds to a semiconductor layer 100S, and the detection chip 202 corresponds to semiconductor layers 100T, 200T, and 200S. In FIG. 11, the semiconductor layers 100S and 100T are represented as a substrate 201_a_, and the semiconductor layers 200T and 200S are represented as a substrate 201_b_. The substrate 201_a_ and the substrate 201_b_ are electrically connected to each other by for example, through electrodes 120E and 121E. The photoelectric conversion unit PD, the floating diffusion FD, and a VSS contact region 118 each have a flat region. The photoelectric conversion unit PD includes, for example, a p-well layer 115 and an n-type semiconductor region 114.

The switching element TRG may be configured by a planar transistor. In this case, for example, a transfer gate TRG is provided on the surface of the semiconductor layer 100S. For example, the side surfaces of this transfer gate TG are covered with a sidewall SW. The sidewall SW contains silicon nitride (SiN), for example. A gate insulating film is provided between the semiconductor layer 100S and the transfer gate TG. The transfer gate TG for each pixel Pix is provided, for example, so as to surround the floating diffusion FD in plan view.

In the semiconductor layer 100S, a pixel separator 117 that separates the pixels ix from each other is provided. The pixel separator 117 is formed to extend in the normal direction of the semiconductor layer 100S (the direction perpendicular to the surface of the semiconductor layer 100S). The pixel separator 117 is provided so as to partition the pixels Pix from each other, and has, for example, a grid-like planar shape (see FIG. 4). The pixel separator 117 electrically and optically separates the pixels Pix from each other, for example. The pixel separator 117 includes, for example, a light shielding film 117A and an insulating film 117B. For example, tungsten (W) or the like is used for the light shielding film 117A. The insulating film 117B is provided between the light shielding film 117A and the p-well layer 115 or the n-type semiconductor region 114. The insulating film 117B is made from, for example, silicon oxide (SiO). The pixel separator 117 has, for example, a full trench isolation (FTI) structure, which penetrates the semiconductor layer 100S. Although not illustrated, the pixel separator 117 is not limited to an FTI structure, which penetrates the semiconductor layer 100S. For example, a deep trench isolation (DTI) structure, which does not penetrate the semiconductor layer 100S may be used. The pixel separator 117 is formed in a part of the semiconductor layer 100S so as to extend in the normal direction of the semiconductor layer 100S.

For example, a pinning region 116 is provided in the semiconductor layer 100S. The pinning region 116 is provided on the side surfaces of the pixel separator 117, specifically between the pixel separator 117 and the p-well layer 115 or the n-type semiconductor region 114. The pinning region 116 is made up of, for example, a p-type semiconductor region.

Figure 12A:
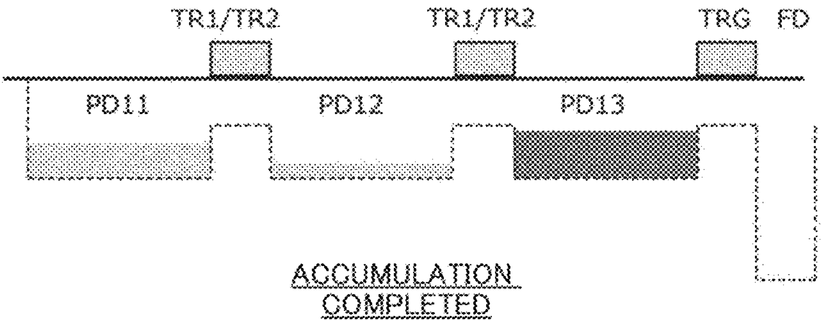
FIG. 12A is a diagram schematically illustrating a state when charge accumulation in a photoelectric conversion unit is completed.
Figure 12B:
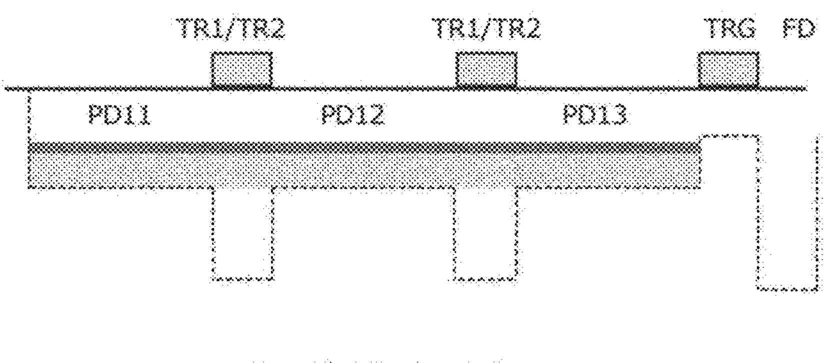
FIG. 12B is a diagram schematically illustrating a state where switching elements are brought into a connected state.
Figure 12C:
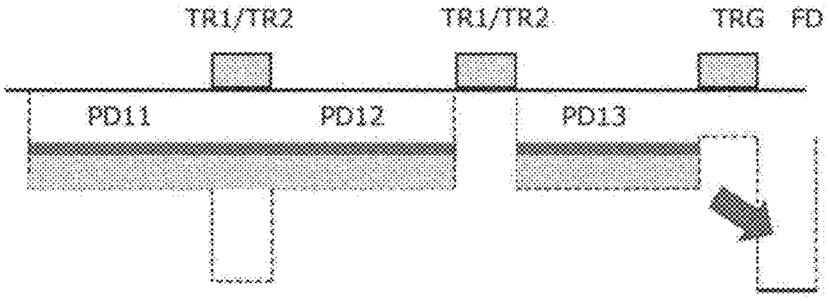
FIG. 12C is a diagram schematically illustrating a state before charges are transferred to a floating diffusion.

FIGS. 12A, 12B, and 12C are diagrams schematically illustrating an example of an operation of each photoelectric conversion unit PD in 3×3 pixels Pix (see FIGS. 6 and 9). Photoelectric conversion units PD and PD33 illustrate some photoelectric conversion units PD and PD33 in the 3×3 pixels Pix (see FIGS. 6 and 9). The photoelectric conversion unit PD33 corresponds to the pixel Pix in the third row and third column in FIG. 9. Specifically, when the photoelectric conversion units PD and P33 are horizontally adjacent, they are electrically connected through the switching element TR1, and when they are vertically adjacent, they are electrically connected through the switching element TR2.

As illustrated in FIG. 7 again, one end of the photoelectric conversion unit PD is connected to the other end of the switching element TR3, the other end of the switching element TR1, and one end of the switching element TR2. As illustrated in FIG. 7, for the photoelectric conversion unit PD, the switching element TR3 is brought into a conductive state, that is, the gate signal is set to high, thereby applying a predetermined positive potential VDD to discharge the accumulated charges for initial reset. The photoelectric conversion unit may be made from a material such as silicon (Si), indium gallium arsenide (InGaAs), or organic germanium (Ge) material. As a material for the switching elements TR1 to TR3, the switching elements TRG, RST, AMP, SEL, FG, and others, for example, silicon (Si), an oxide semiconductor, an organic semiconductor, or the like may be used. With the switching element TR3 in a non-conductive state, that is, with the gate signal set to low, the photoelectric conversion unit PD starts accumulating charges by photoelectric conversion.

FIG. 12A is a diagram schematically illustrating a state when the accumulation of charges in the photoelectric conversion unit PD, 33 is completed. As illustrated in FIG. 12A, the switching elements TR1, TR2, and TRG are made non-conductive, that is, the gate signal is set to low. As a result, the light transmitted through all the photoelectric conversion units PD in the 3×3 pixels Pix generates photocharges. The photocharges are accumulated with a well-shaped positive potential. As will be described later, the accumulation time for the 3×3 pixels Pix is set based on a weight value wij in Equation (1) and based on a control signal from the operational processing unit 142. In other words, as the weight value wij increases, the amount of accumulated charges increases.

FIG. 12B is a diagram schematically illustrating a state where the switching elements TR1 and TR2 are connected. Next, as illustrated in FIG. 12B, the switching elements TR1 and TR are made conductive, that is, the gate signals of the switching elements TR1 and TR are set to high. As a result, the charges accumulated in the 3×3 pixels Pix are averaged and indicate, for example, for example, a value proportional to an image luminance signal Sigij in Equation (1) described later.

FIG. 12C is a diagram schematically illustrating a state before charges are transferred to the floating diffusion FD. As illustrated in FIG. 12C, the switching elements TR1 and TR2 connected to the photoelectric conversion unit PD33 are made non-conductive, that is, the gate signals of the switching elements TR1 and TR2 are set to low. As a result, the charges accumulated in the photoelectric conversion unit PD33 indicate a value proportional to the image luminance signal Sigij represented by Equation (1), which will be described later, for example. Next, the gate signal of the switching element TRG is set to low. Accordingly the charges accumulated in the photoelectric conversion unit PD33 are transferred to the floating diffusion FD. At this time, the photoelectric conversion unit PD33 is separated by the non-conductive switching elements TR1 and TR, so that only one-ninth of the charges is transferred to the floating diffusion FD. As a result, an overflow of the floating diffusion FD is suppressed.

In the present embodiment, an example has been described in which the switching elements TR1 and TR connected to the photoelectric conversion unit PD33 are made non-conductive as a state before transfer of charges to the floating diffusion FD. However, examples are not limited to this. For example, the switching elements TR1 and TR2 connected to the photoelectric conversion unit PD33 may be maintained in a conductive state as a state before the charges are transferred to the floating diffusion FD. In this case, all the accumulated charges can be transferred to the floating diffusion FD.

Figure 13:
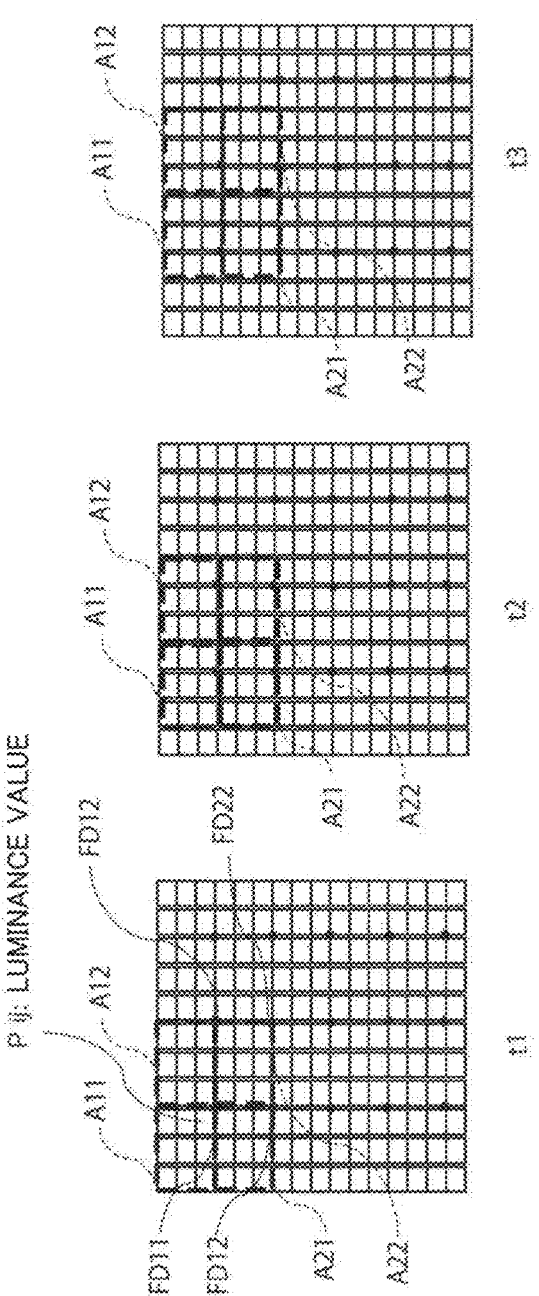
FIG. 13 illustrates addition ranges at some timings and corresponding floating diffusions.
Figure 14:
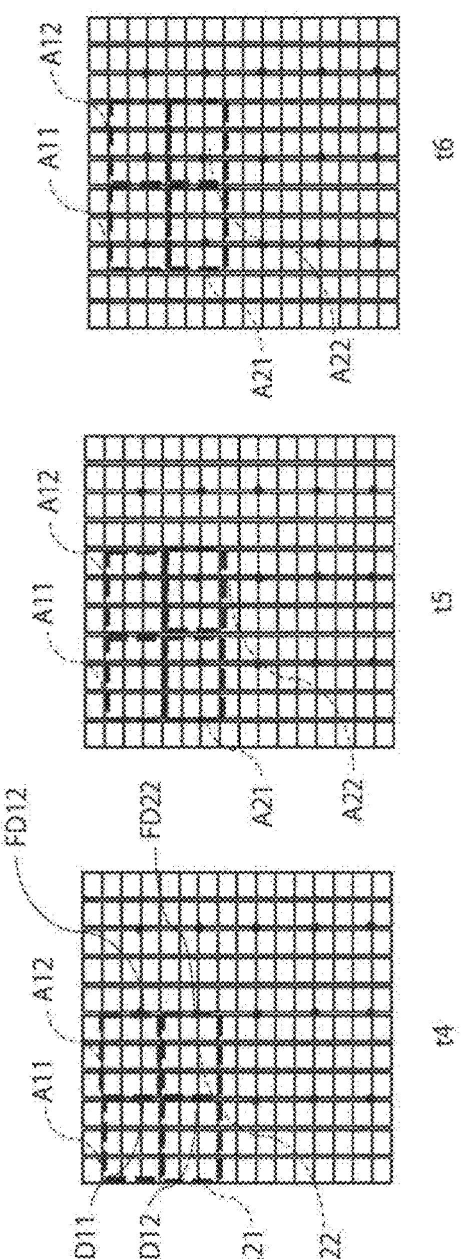
FIG. 14 illustrates addition ranges at some timings.
Figure 15:
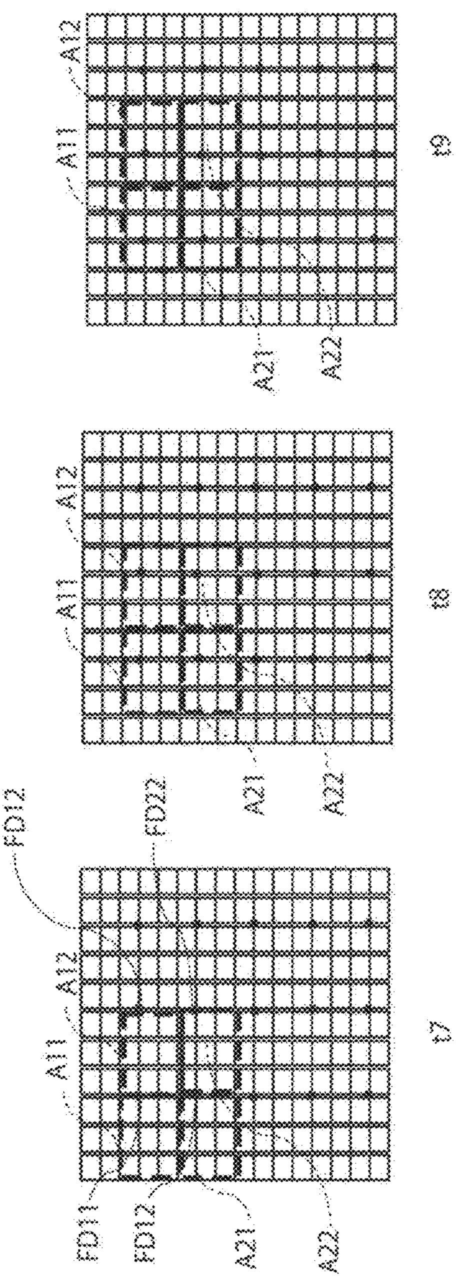
FIG. 15 illustrates addition ranges at different timings from FIG. 14.

Next, an example of an operation will be described in more detail based on FIGS. 13 to 17. FIGS. 13 to 15 are diagrams illustrating ranges for operational processing of weighting operation. FIG. 13 is a diagram illustrating addition ranges A11 to A22 at timings t1 to t3 and corresponding floating diffusions FD11 to FD22. Similarly FIG. 14 illustrates addition ranges at timings t4 to t6, and FIG. 15 is a diagram illustrating addition ranges at timings t7 to t9. In FIGS. 13 to 15, the addition ranges A11 to A22 and the corresponding floating diffusions FD11 to FD22 relatively indicate some regions of the pixel array unit 30.

The addition range for the floating diffusion FD11 is the addition range A11, the addition range for the floating diffusion FD12 is the addition range A12, the addition range for the floating diffusion FD21 is the addition range A21, and the addition range for the floating diffusion FD22 is the addition range A22. The other floating diffusions FDn similarly have addition ranges An. Thus, as represented in Equation (1), the addition ranges overlap in the 3×3 addition ranges A11 to A22, and accordingly addition processing is performed nine times for timings t1 to t9 in the imaging element 200. In other words, imaging is performed nine times for timing t1 to t9.

Figures 16, 17:
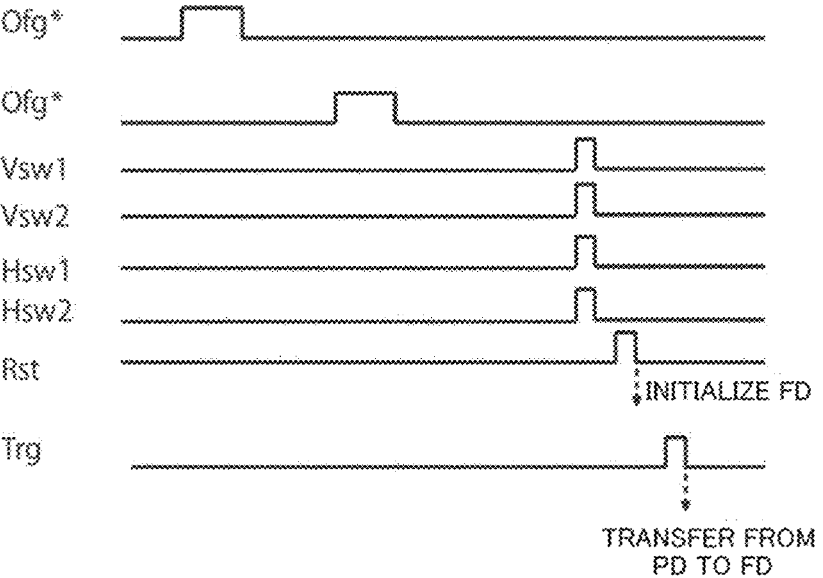
FIG. 16 illustrates an example of 3×3 weight values in Equation (1).
FIG. 17 is a timing chart illustrating an example of processing of the addition range at timing t1 in FIG. 13.

FIG. 16 is a diagram illustrating an example of 3×3 weight values wij in Equation (1). For example, Equation (1) is an example of addition processing used in the processing of the operational processing unit 142 (see FIG. 1). The operational processing unit 142 supplies, for example, information on the weight values wij in Equation (1) to the accumulation control circuit 210 (see FIG. 3) through the control unit 130. In the present embodiment, the weight values wij may be referred to as filter values, and the addition range may be referred to as a filter.

[Math. 1]

$$Sigij = k \times \sum_{i-n}^{i+n} \sum_{j-m}^{j+m} w_{ij} \times p_{ij} \tag{1}$$

Specifically in the weighting operation, as illustrated in Equation (1), an image luminance signal Sigij is calculated by performing addition processing of luminance values pij with weight values wij. Here, i and j indicate the position of a pixel Pix in the pixel array Specifically i indicates a horizontal position in the pixel array unit 30, and j indicates a vertical position. Further, n and m are predetermined natural numbers and correspond to an addition range. For example, for a 3×3 addition range, n=m=1. The luminance value pij corresponds to the charges accumulated in the photoelectric conversion unit PD in the pixel range Pix at positions i and j. In this case, the luminance values pij are added with different weight values wij in the addition processing of the image luminance signal Sigij (i−n≤i≤i+n, j−m≤j≤j+m). For example, for n=m=1, addition processing is performed on luminance values pij with different weight values wij nine times. As can be seen from these operations, the addition range A11 in FIGS. 13 to 15 is an example of an addition range in which, for example, the luminance values pij in Equation (1) are included for the addition processing.

At timing t1, charges proportional to the charges accumulated in the 3×3 photoelectric conversion units PD in the addition range A11 are finally accumulated in the floating diffusion FD11. Similarly charges proportional to the charges accumulated in the 3×3 photoelectric conversion units PD in the addition range A12 are finally accumulated in the floating diffusion FD12. Similarly charges proportional to the charges accumulated in the 3×3 photoelectric conversion units PD in the addition range A21 are finally accumulated in the floating diffusion FD11. Similarly charges proportional to the charges accumulated in the 3×3 photoelectric conversion units PD in the addition range A22 are finally accumulated in the floating diffusion FD22.

Next, at timing t2, the addition ranges A11 to A22 are shifted to the right by one pixel range, and at timing t3, the addition ranges A11 to A22 are further shifted to the right by one pixel range. As illustrated in FIG. 14, next, at timing t4, the addition ranges A11 to A22 are shifted down by one pixel range from the position at timing t1, at timing t5, the addition ranges A11 to A22 are further shifted to the right by one pixel range, and at timing t6, the addition ranges A11 to A22 are further shifted to the right by one pixel range. As illustrated in FIG. 15, next, at timing t5, the addition ranges A11 to A22 are shifted down by one pixel range from the one at timing t4, and at timing t5, the addition ranges A11 to A22 are further shifted to the right by one pixel range, and at timing t6, the addition ranges A11 to A22 are further shifted to the right by one pixel range. In this way for example, in the operational processing of weighting operation represented in Equation (1), the addition processing is performed nine times while changing the addition ranges A11 to A22.

More specifically the accumulation control circuit 210 (see FIG. 3) supplies signals Ofg1 to OfgH*V having time information proportional to a weight value wij to each pixel Pix. Then, the photoelectric conversion unit PD in each pixel Pix performs photoelectric conversion to accumulate charges based on the signals Ofg1 to OfgH*V for a time proportional to the weight value wij. In other words, in the present embodiment, an operation corresponding to the weight value wij is performed by performing photoelectric conversion for a time proportional to the weight value wij. Finally one-ninth of the accumulated charges for each pixel Pix is transferred to the floating diffusion FD.

FIG. 17 is a timing chart illustrating an example of processing of the addition range A11 at timing t1 in FIG. 13. The example of processing of the addition range A11 will be described based on FIG. 17 with reference to FIGS. 6 to 8.

As illustrated in FIG. 17, the vertical axis indicates any two signals Ofg*, signals Vsw1, Vsw2, Hsw1, Hsw2, Rst, and Trg in order from the top. The horizontal axis indicates time. In response to a high level signal as the signal Ofg*, the switching element TR3 of the pixel Pix* is brought into a conductive state, and accordingly the charges in the photoelectric conversion unit PD are discharged to the power supply VDD for initialization. Subsequently when the signal Ofg* transitions to a low level signal, the photoelectric conversion unit PD accumulates charges corresponding to an amount of light received for a time proportional to the weight value wij. Similarly the other pixels Pix* each accumulate charges corresponding to an amount of light received for a time proportional to the weight value wij.

Next, at the timing when the signals Vsw1, Vsw2, Hsw1, and Hsw2 become high, the switching element TR2 between the pixels Pix in the first and second rows is brought into a conductive state. Similarly the switching element TR2 between the pixels Pix in the second row and third row is brought into a conductive state. Similarly the switching element TR1 between the pixels Pix in the first and second columns is brought into a conductive state. Similarly the switching element TR1 between the pixels Pix in the second and third columns is brought into a conductive state. Then, at the timing when the signals Vsw1, Vsw2, Hsw1, and Hsw2 become low, charges corresponding to a processing result equivalent to the addition processing of Equation (1) are accumulated in the photoelectric conversion unit PD in the third row and third column.

Next, at the timing when the signal Rst becomes high, the switching element RST is brought into a conductive state, and the charges in the floating diffusion FD are discharged. Then, at the timing when the signal Rst becomes low, the switching element RST is brought into a non-conductive state.

Next, at the timing when the signal Trg becomes high, the switching element TRG is brought into a conductive state, and at the same time, the switching element TR2 of the pixel Pix in the third row and third column is brought into a conductive state. Accordingly all the charges accumulated in the photoelectric conversion unit PD in the third row and third column are transferred to the floating diffusion FD. At the same time, similar driving is performed for the other addition ranges A12 to An, and charges corresponding to the addition ranges A12 to An are accumulated in each floating diffusion FD. Then, as described above, charges of each floating diffusion FD connected to the same VS1 line are sequentially amplified and converted into a digital luminance signal in a time-division manner.

Figure 18:
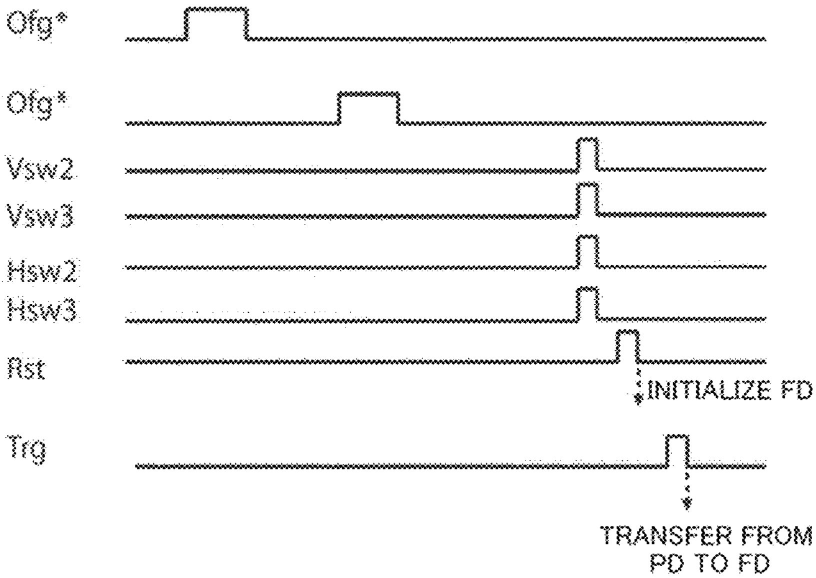
FIG. 18 is a timing chart illustrating an example of processing of addition range 1 at timing t5 in FIG. 14.

FIG. 18 is a timing chart illustrating an example of processing of the addition range A11 at timing t5 in FIG. 14. The example for timing t5 differs from the example of processing of the addition range A11 at timing t1 because of a difference in the relative position of the floating diffusion FD in the addition range A11. Specifically at the timing when the signals Vsw2, Vsw3, Hsw2, and Hsw3 become high, the switching element TR2 between the pixels Pix on the second row and third row is brought into a conductive state. Similarly the switching element TR2 between the pixels Pix in the third row and fourth row is brought into a conductive state. Similarly the switching element TR1 between the pixels Pix in the second column and third columns is brought into a conductive state. Similarly the switching element TR1 between the pixels Pix in the third column and fourth column is brought into a conductive state. Then, at the timing when the signals Vsw2, Vsw3, Hsw2, and Hsw3 become low, charges corresponding to a processing result equivalent to the addition processing of Equation (1) are accumulated in the photoelectric conversion unit PD in the third row and third column. Processing after that is the same as the example of processing of the addition range A11 at timing t1. Then, the operational processing unit 142 acquires the image luminance signals Sigij calculated for the entire pixel range of the pixel array unit 30, for example, represented by Equation (1), making it possible to perform subsequent image processing. Thus, repetitive operations such as weighted addition processing, which have a relatively large computational load, are performed in the solid-state imaging element 200 through the process of transferring accumulated charges, making it possible to further speed up the processing of the operational processing unit 142.

As described above, according to the present embodiment, the photoelectric conversion unit PD of each pixel Pix performs photoelectric conversion for a time proportional to the weight value wij of the weighting operation (e.g., Equation (1)), which is an example of repetitive addition processing, to accumulate charges. As a result, the accumulated charges of the pixels Pix are added, so that it is possible to perform a weighting operation (e.g., Equation (1)) using analog signals.

In addition, the accumulated charges can be transferred between pixels Pix, so that it is possible to change the position of the addition range A11 without providing only one floating diffusion FD corresponding to the addition range A11. As a result, even when the luminance values pij are added with different weight values wij in the addition processing for the image luminance signal Sigij ($i-n \le i \le i+n$, $j-m \le j \le j+m$), such processing can be performed without increasing the number of floating diffusion FDs. As a result, it is possible to suppress an increase in the size of the operational element 200.

(Modification Example of First Embodiment)

An imaging device 100 according to a modification example of the first embodiment differs from the imaging device 100 according to the first embodiment in that the pixel circuit AFD further includes a floating diffusion FD2 and the capacity of the floating diffusion FD can be changed. Differences from the imaging device 100 according to the first embodiment will be described below.

Figure 19:
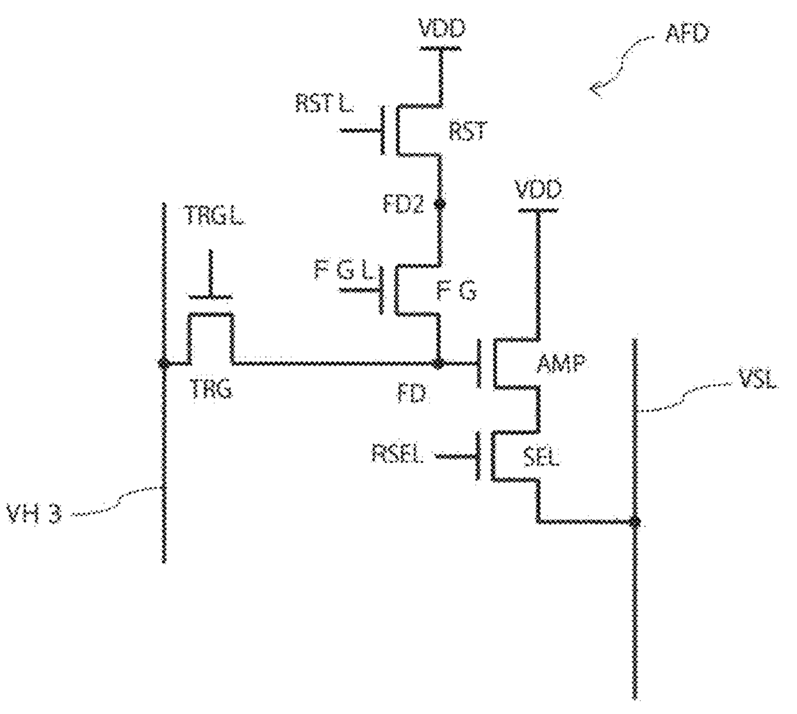
FIG. 19 is a circuit diagram illustrating a configuration example of a pixel circuit according to a modification example of the first embodiment.

FIG. 19 is a circuit diagram illustrating a configuration example of the pixel circuit AFD according to the modification example of the first embodiment. The pixel circuit AFD further includes the floating diffusion FD2, a control line FGL, and a switching element FG. One end of the control line FGL is connected to the third access control circuit 211*c* (see FIG. 3). A control signal Fg is supplied to this control line TRGL by the third access control circuit 211*c*. The switching element FG is, for example, an N-type metal oxide semiconductor (MOS) transistor.

One end of the switching element RST is connected to the floating diffusion FD2, and the other end is connected to the power supply voltage VDD. One end of the switching element FG is connected to the floating diffusion FD, and the other end is connected to the floating diffusion FD2. The gate of the switching element FG is connected to the control line FGL.

With this configuration, by the switching element FG being brought into a conductive state, the floating diffusion FD and the floating diffusion FD2 are connected in parallel, making it possible to increase the capacitance. Therefore, depending on the amount of imaging light of the imaging element 200, it is possible to switch between using the floating diffusion FD and using the floating diffusion FD and the floating diffusion FD2.

In a case of using the floating diffusion FD and the floating diffusion FD2, the switching element FG and the switching element RST are brought into a conductive state based on the control signals Fg and Rst. As a result, the charges accumulated in the floating diffusion FD and the floating diffusion FD2 are discharged. Next, the switching element RST is brought into a non-conductive state based on the control signal Rst. As a result, after an exposure period T ends, when the switching element TRG is brought into a conductive state based on the control signal Trg, the floating diffusion FD and the floating diffusion FD2 accumulate charges transferred from the photoelectric conversion unit PD through the switching element TRG.

Next, when the switching element SEL is brought into a conductive state based on the control signal Sel, the pixel circuit AFD is electrically connected to the signal line VSL. As a result, the switching element AMP is connected to the constant current source 220 (see FIG. 5) of the readout unit 212, and operates as a so-called source follower. A voltage based on the voltages of the floating diffusion FD and floating diffusion FD2 at that time is output to the ADC 230 as the image luminance signal Sig, as described above.

In a case of using only the floating diffusion FD, the switching element FG and the switching element RST are brought into a conductive state based on the control signals Fg and Rst. As a result, the charges accumulated in the floating diffusion FD and the floating diffusion FD2 are discharged. Next, the switching element FG is brought into a non-conductive state based on a control signal Fgt. As a result, after the exposure period T, when the switching element TRG is brought into a conductive state based on the control signal Trg, the floating diffusion FD accumulates charges transferred from the photoelectric conversion unit PD through the switching element TRG. After that, the same processing as described above is performed.

As described above, in the imaging device 100 according to the modification example of the first embodiment, the pixel circuit AFD further includes the floating diffusion FD2. This makes it possible to change the capacity of the floating diffusion FD according to the amount of light received by the solid-state imaging element 200, making it possible to adjust the imaging sensitivity and capacity of accumulated charges.

Second Embodiment

An imaging device 100 according to a second embodiment differs from the imaging device 100 according to the first embodiment in that the pixel circuit AFD performs initialization processing for the pixel Pix connected to the pixel circuit AFD. Differences from the imaging device 100 according to the first embodiment will be described below.

Figure 20:
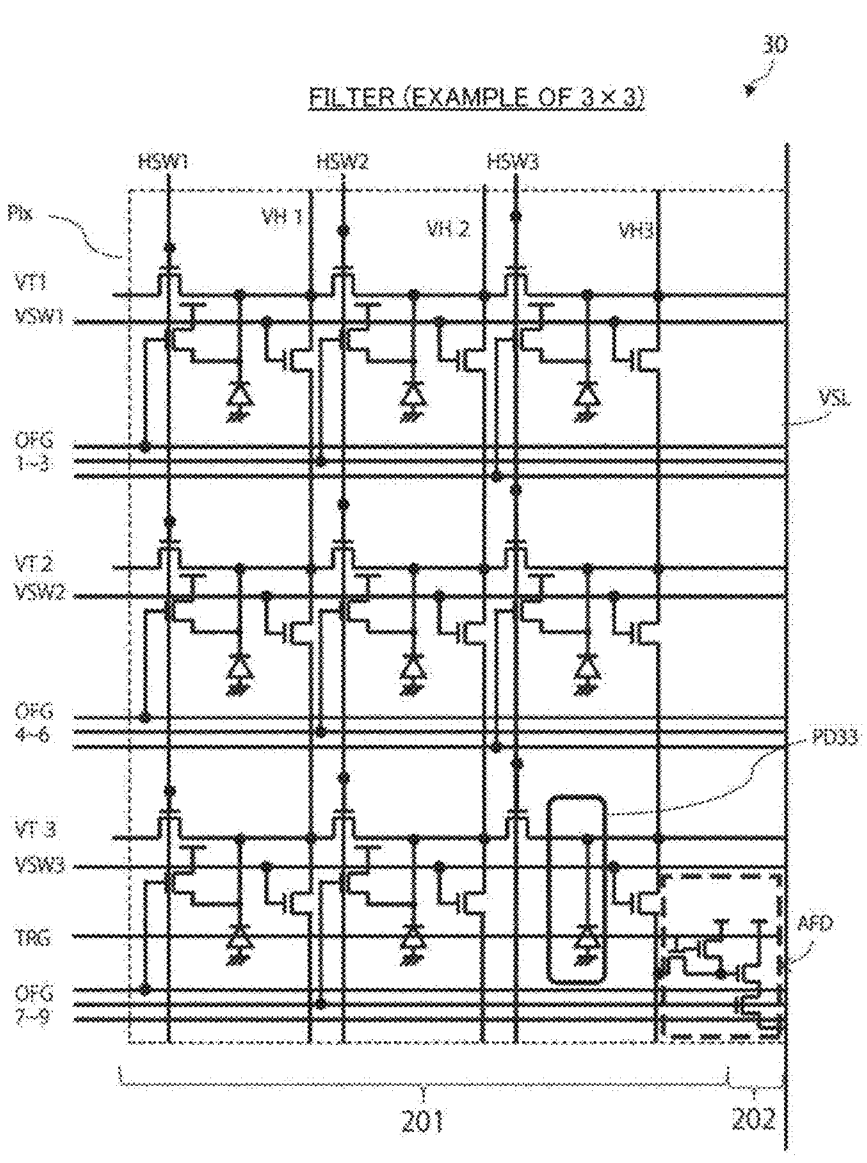
FIG. 20 is a diagram illustrating a configuration example of a pixel array unit according to a second embodiment.

FIG. 20 is a diagram illustrating a configuration example of a pixel array unit 30 according to the second embodiment. As illustrated in FIG. 19, the photoelectric conversion unit PD33 in the third row and third column differs from the configuration example of the pixel array unit 30 illustrated in FIG. 6 in that it does not include the switching element TR3 for reset.

Figure 21:
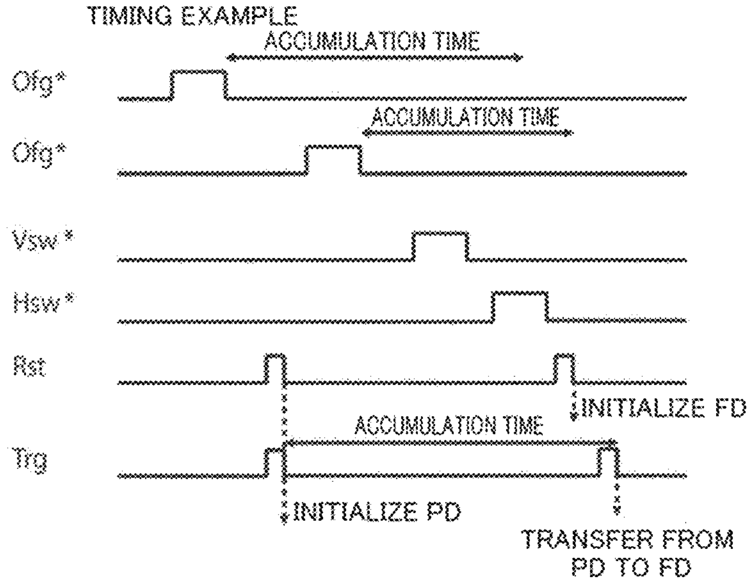
FIG. 21 is a timing chart illustrating an example of addition processing in the pixel array unit of FIG. 20.

FIG. 21 is a timing chart illustrating an example of addition processing in the pixel array unit 30 of FIG. 20. Accumulation in the photoelectric conversion unit PD and charge transfer are performed in the same manner as in FIG. 17 and FIG. 17. In this case, the reset drive of the photoelectric conversion unit PD33 differs from the processing of FIG. 17 and FIG. 17 and others.

To reset the photoelectric conversion unit PD33, the switching element TR2 of the pixel Pix in the third row and third column is brought into a conductive state, and at the same time, the control signals Rst and Trg are set to high level, and accordingly the switching elements RST and TRG are brought into a conductive state. Accordingly the accumulated charges in the photoelectric conversion unit PD33 are discharged through the switching elements RST and TRG. Then, the switching elements RST and TRG are brought into a non-conductive state, and at the same time, the switching element TR2 is brought into a non-conductive state. In this way the pixel circuit AFD can discharge the charges from the photoelectric conversion unit PD33 in the third row and third column for initialization.

Figure 22:
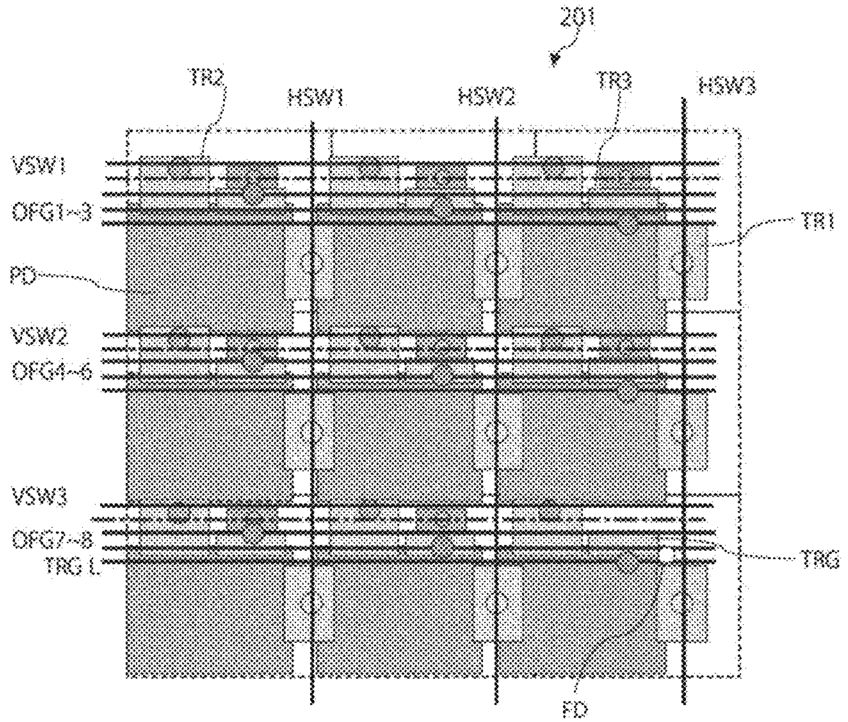
FIG. 22 is a plan view of a detection chip of the pixel array unit illustrated in FIG. 20.

FIG. 22 is a plan view of a detection chip 202 of the pixel array unit 30 illustrated in FIG. 20. As illustrated in FIG. 22, the photoelectric conversion unit PD33 in the third row and third column does not include the switching element TR3 for reset, so that the switching element TRG and the floating diffusion FD of the pixel circuit AFD can be arranged on the side of the switching element TR3. As a result, it is possible to further widen the aperture of the photoelectric conversion unit PD33 in the third row and third column.

As described above, in the imaging device 100 according to the present embodiment, the pixel circuit AFD performs the initialization processing for the pixel Pix connected to the pixel circuit AFD. This allows the pixel array unit 30 to be configured without providing the switching element TR3 of the pixel Pix, making it possible to further reduce the size of the imaging element 200 and widen the aperture of the photoelectric conversion unit PD33 in the third row and third column.

Third Embodiment

In the imaging device 100 according to the first embodiment, the switching elements TR1 and TR2 are brought into a connected state, the charges accumulated in the 3×3 pixels Pix are averaged, and the resulting charges are transferred to the floating diffusion FD. On the other hand, an imaging device 100 according to the first embodiment differs in that the charges accumulated in the 3×3 pixels Pix are sequentially added row by row or column by column. Differences from the imaging device 100 according to the first embodiment will be described below.

Figure 23:
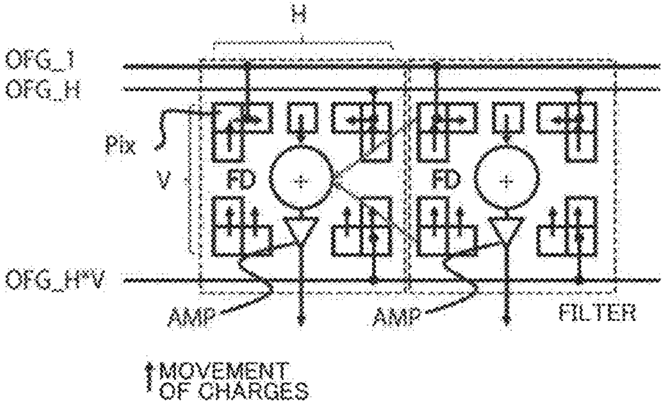
FIG. 23 is a diagram schematically illustrating an example of transferring accumulated charges for each pixel to a floating diffusion.

FIG. 23 is a diagram schematically illustrating an example of processing of transferring accumulated charges for each pixel Pix to the floating diffusion FD according to the third embodiment. FIG. 23 illustrates an example of imaging an addition range H*V at timing tn. More specifically, the accumulation control circuit 210 (see FIG. 3) supplies signals Ofg1 to OfgH*V having time information proportional to a weight value wij to each pixel Pix. Then, the photoelectric conversion unit PD in each pixel Pix performs photoelectric conversion to accumulate charges based on the signals Ofg1 to OfgH*V for a time proportional to the weight value wij. In other words, in the present embodiment, an operation corresponding to the weight value wij is performed by performing photoelectric conversion for a time proportional to the weight value wij. Then, according to the control of the accumulation control circuit 210, the first access control circuit 211*a*, the second access control circuit 211*b*, and the third access control circuit 211*c*, the accumulated charges are transferred between the photoelectric conversion units PD of pixels Pix in order. As a result, the accumulated charges for each pixel Pix are finally transferred to the floating diffusion FD.

Figure 24:
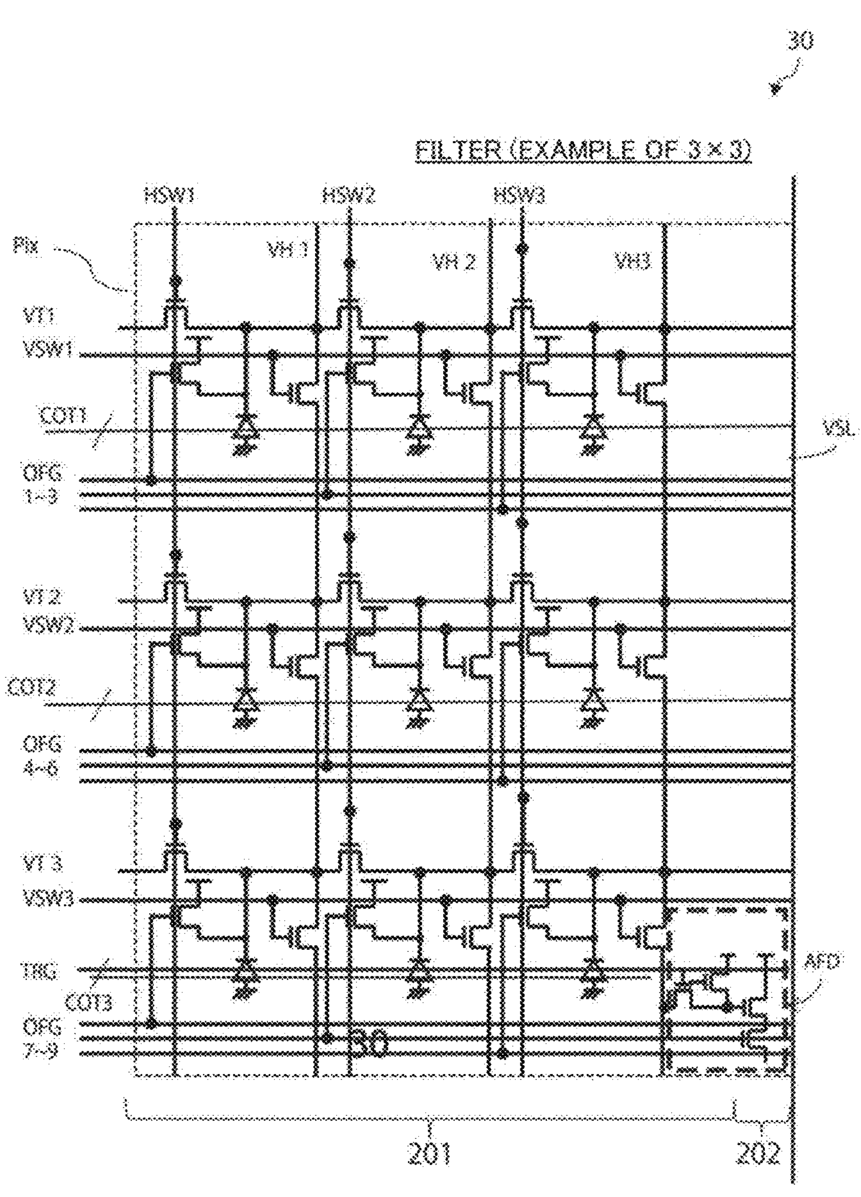
FIG. 24 is a diagram illustrating a configuration example of a pixel array unit according to a third embodiment.
Figure 25:
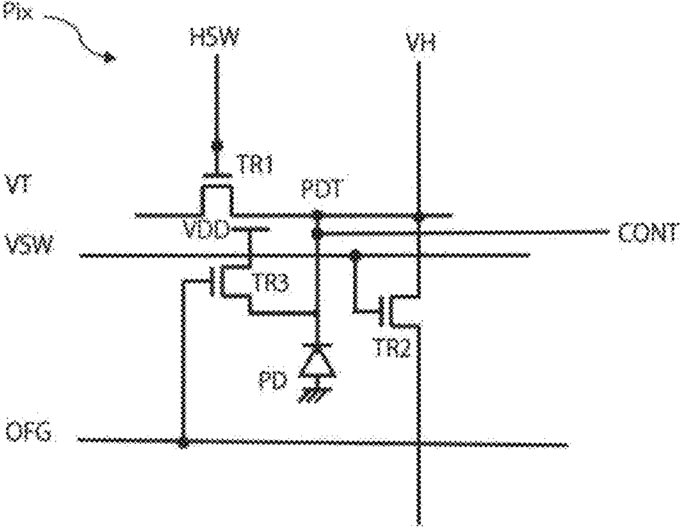
FIG. 25 is a diagram illustrating a configuration example of a pixel according to the third embodiment.

FIG. 24 is a diagram illustrating a configuration example of a pixel array unit 30 according to the third embodiment. For example, this is a configuration example of 3×3 pixels Pix in the upper left of the FD in FIG. 4. FIG. 25 is a diagram illustrating a configuration example of a pixel Pix according to the third embodiment. As illustrated in FIG. 25, the pixel Pix includes switching elements TR1 to TR3 and a photoelectric conversion unit PD. A potential control line CONT (hereinafter sometimes referred to as COT) is connected to the photoelectric conversion unit PD.

As illustrated in FIG. 24, accumulation control lines OFG1 to OFG9 connect each pixel Pix to the accumulation control circuit 210 (see FIG. 3). Similarly potential control lines COT1 to COT3 connect each pixel Pix to the accumulation control circuit 210 (see FIG. 3). The subsequent connection relationships are the same as those in FIG. 6, and thus, the description thereof will be omitted.

Figure 26A:
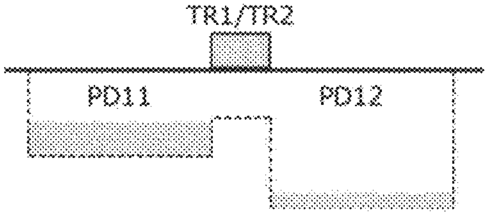
FIG. 26A is a diagram illustrating a charge accumulation state.
Figure 26B:
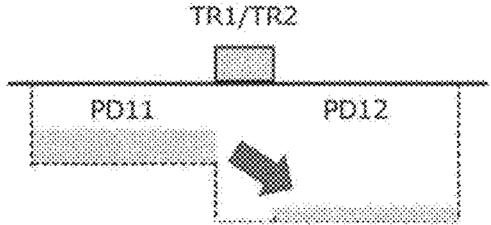
FIG. 26B is a diagram schematically illustrating a state where a switching element is brought into a conductive state.
Figure 26C:
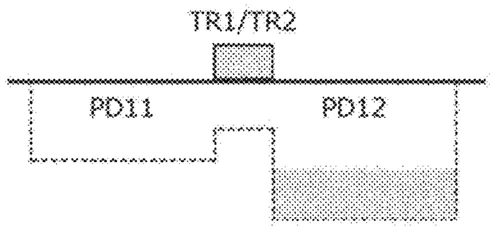
FIG. 26C is a diagram schematically illustrating a state where the switching element is brought into a non-conductive state.

FIGS. 26A, 26B, and 26C are diagrams schematically illustrating a configuration example and an operation example of photoelectric conversion units PD in chronological order. As illustrated in FIGS. 26A, 26B, and 26C, each photoelectric conversion unit PD according to the present embodiment is a photoelectric conversion unit that can change the positive potential shape.

FIG. 26A is a diagram illustrating a state where charges are accumulated. In FIG. 26A, adjacent pixels PD11 and PD12 are schematically illustrated. As illustrated in FIG. 26A, switching elements TR1 and TR2 are made non-conductive, that is, their gate signals are set to low. Then, a voltage corresponding to, for example, the transfer order is applied in advance to a terminal PDT from the potential control line COT. Thus, a step is formed in the well-shaped positive potential. In the example of FIG. 26A, control is performed to transfer charges from the pixel PD11 side to the pixel PD12 side, so that the potential on the pixel PD12 side is deeper on the positive potential side than on the pixel PD11 side. Then, the light transmitted through the photoelectric conversion unit PD generates photocharges. The photocharges are accumulated by the well-shaped positive potential.

FIG. 26B is a diagram schematically illustrating a state where the switching elements TR1 and TR2 are brought into a conductive state. As illustrated in FIG. 26B, the switching elements TR1 and TR2 are made conductive, that is, their gate signals are set to high. Accordingly the charges accumulated in the photoelectric conversion unit PD11 are transferred to the photoelectric conversion unit PD12 on the deeper side (larger side) of the positive potential.

FIG. 26C is a diagram schematically illustrating a state where the switching elements TR1 and TR2 are brought into a non-conductive state. Next, as illustrated in FIG. 26C, the switching elements TR1 and TR2 are made non-conductive to complete the charge transfer. By repeating the processing illustrated in FIGS. 26B and 26C, charges are transferred between pixels.

Figure 27:
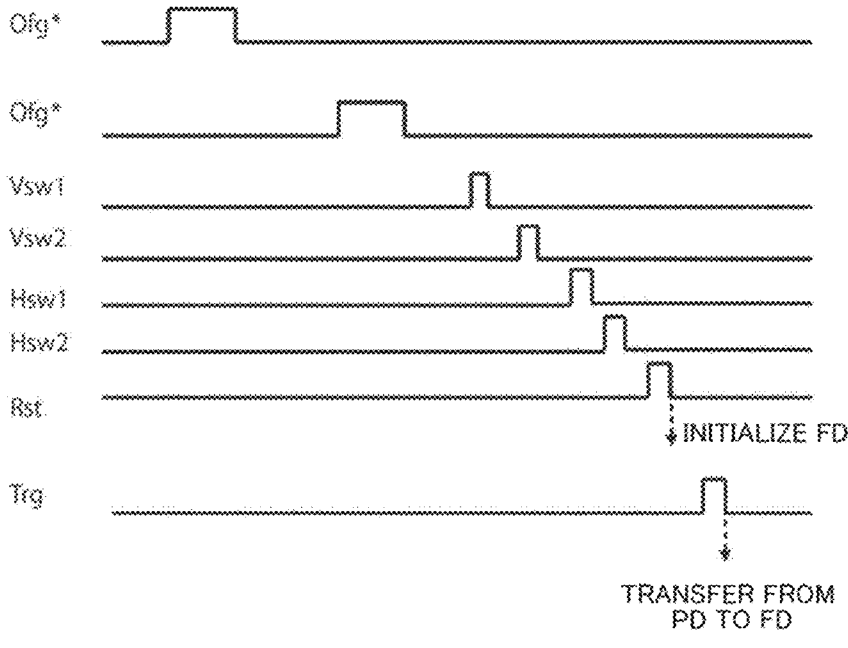
FIG. 27 is a timing chart illustrating an example of processing of the addition range at timing t1 in FIG. 13.

FIG. 27 is a timing chart illustrating an example of processing of the addition range A11 at timing t1 in FIG. 13. The example of processing of the addition range A11 will be described based on FIG. 27 with reference to FIGS. 24, 25, and 10.

As illustrated in FIG. 27, the vertical axis indicates any two signals Ofg*, signals Vsw1, Vsw2, Hsw1, Hsw2, Rst, and Trg in order from the top. The horizontal axis indicates time. In response to a high level signal as the signal Ofg*, the switching element TR3 of the pixel Pix* is brought into a conductive state, and accordingly the charges in the photoelectric conversion unit PD are discharged to the power supply VDD for initialization. Subsequently when the signal Ofg* transitions to a low level signal, a predetermined bias voltage is applied to the photoelectric conversion unit PD via the signal line CONT, and the photoelectric conversion unit PD accumulates charges corresponding to an amount of light received for a time proportional to the weight value wij. Similarly the other pixels Pix* each accumulate charges corresponding to an amount of light received for a time proportional to the weight value wij.

Next, at the timing when the signal Vsw1 becomes high, the switching element TR2 between the pixels Pix in the first row and second row is brought into a conductive state. At this time, the bias voltage of the photoelectric conversion unit PD in the second row is set higher than the bias voltage of the photoelectric conversion unit PD in the first row. Accordingly the accumulated charges of the photoelectric conversion unit PD in the pixel Pix in the first row are transferred to the photoelectric conversion unit PD in the pixel Pix in the second row. Then, when the signal Vsw1 becomes low level, the switching element TR2 is brought into a non-conductive state again.

Next, at the timing when the signal Vsw2 becomes high, the switching element TR2 between the pixels Pix in the second row and third row is brought into a conductive state. At this time, the bias voltage of the photoelectric conversion unit PD in the third row is set higher than the bias voltage of the photoelectric conversion unit PD in the second row. Accordingly the accumulated charges of the photoelectric conversion unit PD in the pixel Pix in the second row are transferred to the photoelectric conversion unit PD in the pixel Pix in the third row. Then, when the signal Vsw1 becomes low level, the switching element TR2 is brought into a non-conductive state again.

Next, at the timing when the signal Hsw1 becomes high, the switching element TR1 between the pixels Pix in the first column and second column is brought into a conductive state. At this time, the bias voltage of the photoelectric conversion unit PD in the second column is set higher than the bias voltage of the photoelectric conversion unit PD in the first column. Accordingly the accumulated charges of the photoelectric conversion unit PD in the pixel Pix in the first column are transferred to the photoelectric conversion unit PD in the pixel Pix in the second column. Then, when the signal Vsw1 becomes low level, the switching element TR1 is brought into a non-conductive state again.

Next, at the timing when the signal Hsw2 becomes high, the switching element TR1 between the pixels Pix in the second column and third column is brought into a conductive state. At this time, the bias voltage of the photoelectric conversion unit PD in the third column is set higher than the bias voltage of the photoelectric conversion unit PD in the second column. Accordingly the accumulated charges of the photoelectric conversion unit PD in the pixel Pix in the second column are transferred to the photoelectric conversion unit PD in the pixel Pix in the third column. Then, when the signal Vsw1 becomes low level, the switching element TR1 is brought into a non-conductive state again.

Next, at the timing when the signal Rst becomes high, the switching element RST is brought into a conductive state, and the charges in the floating diffusion FD are discharged. Then, at the timing when the signal Rst becomes low, the switching element RST is brought into a non-conductive state.

Next, at the timing when the signal Trg becomes high, the switching element TRG is brought into a conductive state, and at the same time, the switching element TR2 of the pixel Pix in the third row and third column is brought into a conductive state. At this time, in the pixel Pix in the third row and third column, the bias voltage of the floating diffusion FD is set higher than the bias voltage of the photoelectric conversion unit PD. Accordingly the charges of the photoelectric conversion unit PD in the pixel Pix in the row and third column are transferred to the floating diffusion FD. At the same time, similar driving is performed for the other addition ranges A12 to An, and charges corresponding to the addition ranges A12 to An are accumulated in each floating diffusion FD. Then, as described above, charges of each floating diffusion FD connected to the same VS1 line are sequentially amplified and converted into a digital luminance signal in a time-division manner.

Figure 28:
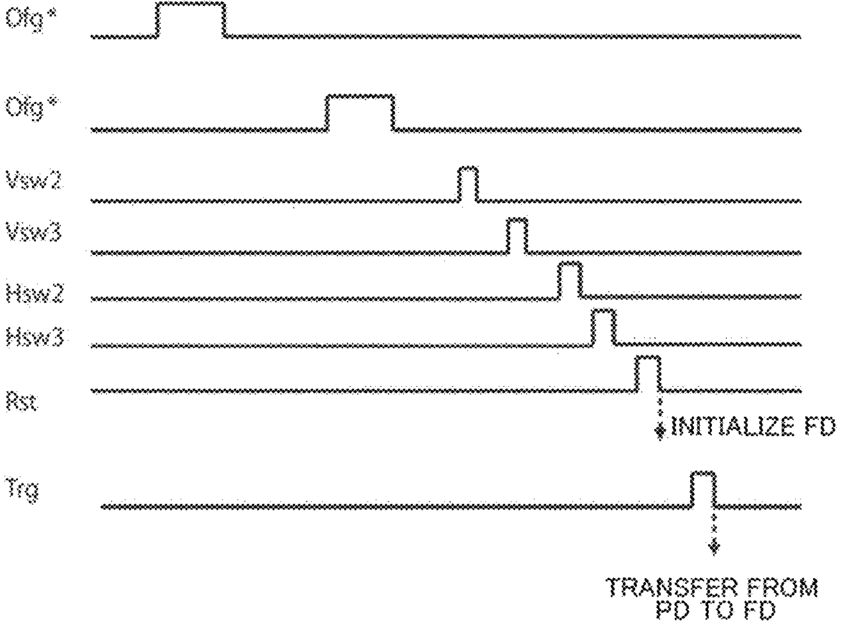
FIG. 28 is a timing chart illustrating an example of processing of the addition range at timing t5 in FIG. 14.

FIG. 28 is a timing chart illustrating an example of processing of the addition range A11 at timing t5 in FIG. 13. The example for timing t5 differs from the example of processing of the addition range A11 at timing t1 because of a difference in the relative position of the floating diffusion FD in the addition range A11. Specifically the accumulated charges of the photoelectric conversion unit PD in the pixel Pix in the second row in the addition range A11 are transferred to the photoelectric conversion unit PD in the pixel Pix in the third row, and then the accumulated charges of the photoelectric conversion unit PD in the pixel Pix in the third row in the addition range A11 are transferred to the photoelectric conversion unit PD in the pixel Pix in the second row. Then, the accumulated charges of the photoelectric conversion unit PD in the pixel Pix in the second column in the addition range A11 are transferred to the photoelectric conversion unit PD in the pixel Pix in the third column, and then the accumulated charges of the photoelectric conversion unit PD in the pixel Pix in the third column in the addition range A11 are transferred to the photoelectric conversion unit PD in the pixel Pix in the second column. Processing after that is the same as the example of processing of the addition range A11 at timing t1. Then, the operational processing unit 142 acquires the image luminance signals Sigij calculated for the entire pixel range of the pixel array unit 30, for example, represented by Equation (1), making it possible to perform subsequent image processing. Thus, repetitive operations such as weighted addition processing, which have a relatively large computational load, are performed in the solid-state imaging element 200 through the process of transferring accumulated charges, making it possible to further speed up the processing of the operational processing unit 142.

As described above, according to the present embodiment, in addition to the same effects as the first embodiment, the accumulated charges of all pixels Pix can be transferred to the floating diffusion FD. As a result, it is possible to further increase the ratio of the image signal to the offset noise of the pixel Pix, that is, increase the SN ratio.

Modification Example 1 of Third Embodiment

The imaging device 100 according to the third embodiment directly controls the potential of the photoelectric conversion unit PD through the potential control line CONT. By contrast, an imaging device 100 according to modification example 1 of the third embodiment differs in that it controls the potential of a photo gate through the potential control line CONT. Differences from the imaging device 100 according to the third embodiment will be described below.

Figure 29A:
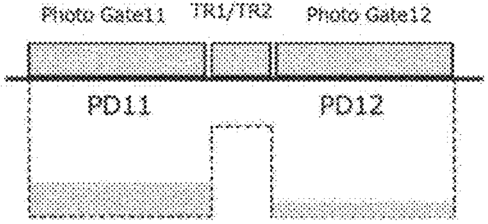
FIG. 29A is a diagram schematically illustrating a charge transfer operation of adjacent photoelectric conversion units.

FIG. 29A is a diagram schematically illustrating a charge transfer operation of adjacent photoelectric conversion units PD11 and PD12. Aphotogate 11 (Photo Gate11) and a photogate 12 (Photo Gate12) are arranged for the photoelectric conversion units PD11 and PD12, respectively. Asignal potential is supplied to the photogate 11 (Photo Gate11) and the photogate 12 (Photo Gate11) through the potential control line CONT. First, the switching element TR3 is brought into a conductive state to discharge the charges accumulated in the photoelectric conversion units PD1 and PD2 for initial reset. Next, the switching elements TR1, TR2, and TR3 are made non-conductive to accumulate charges corresponding to the amount of light received. At the accumulation, the potentials applied to the photogate 11 (Photo Gate11) and the photogate 12 (Photo Gate12) are substantially the same.

Figure 29B:
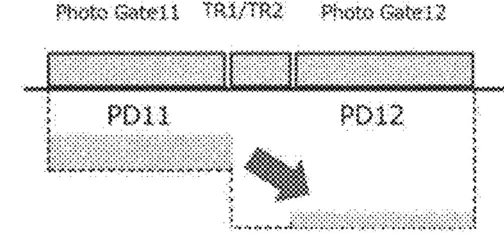
FIG. 29B is a diagram schematically illustrating a state where a switching element is brought into a conductive state.

FIG. 29B is a diagram schematically illustrating a state where the switching elements TR1 and TR2 are brought into a conductive state. Next, as illustrated in FIG. 29B, the switching elements TR1 and TR2 are made conductive, that is, the gate signal is set to high. At this time, the signal potential of the photogate 11 is made lower than the signal potential of the photogate 12 through the potential control line CONT. Accordingly the charges accumulated in the photoelectric conversion unit PD11 are transferred to the photoelectric conversion unit PD12 on the deeper side (larger side) of the positive potential.

Figure 29C:
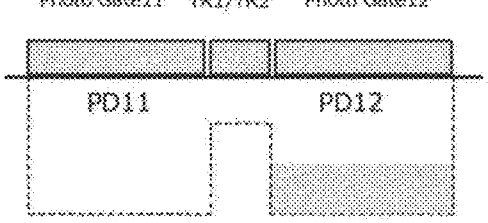
FIG. 29C is a diagram schematically illustrating a state where the switching element is brought into a non-conductive state.

FIG. 29C is a diagram schematically illustrating a state where switching elements TR1 and TR2 are brought into a non-conductive state. Next, as illustrated in FIG. 29C, the switching elements TR1 and TR2 are made non-conductive to complete the charge transfer. At the end of the accumulation, the potentials applied to the photogate 11 (Photo Gate11) and the photogate 12 (Photo Gate12) are substantially the same. By repeating the processing illustrated in FIGS. 29B and 29C, charges are transferred between pixels. Processing and others after that are the same as those of the imaging device 100 according to the third embodiment.

As described above, according to the present embodiment, in addition to the same effect as the modification example of the third embodiment, charges can be transferred using the photogate 11 (Photo Gate11) and the photogate 12 (Photo Gate11). As a result, it is possible to control the bias potential of the photoelectric conversion unit PD more accurately and thus to perform transfer control more accurately.

Modification Example 2 of Third Embodiment

The imaging device 100 according to the third embodiment directly controls the potential of the photoelectric conversion unit PD through the potential control line CONT. By contrast, an imaging device 100 according to modification example 2 of the third embodiment differs in that it controls switching elements SW-11 and SW-12 through the potential control line CONT. Differences from the imaging device 100 according to the third embodiment will be described below.

Figure 30A:
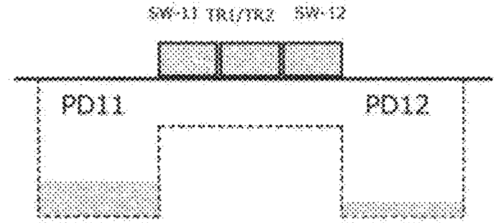
FIG. 30A is a diagram schematically illustrating a charge transfer operation of adjacent photoelectric conversion units.

FIG. 30A is a diagram schematically illustrating a charge transfer operation of adjacent photoelectric conversion units PD11 and PD12. A switching element SW-11 and a switching element SW-12 are arranged adjacent to the switching elements TR1 and TR2. The switching element SW-11 and the switching element SW-12 are, for example, transistors. Thus, it is possible to form substantially the same potential as those of the switching elements TR1 and TR2.

A signal potential is supplied to the switching element SW-11 and the switching element SW-12 through the potential control line CONT. First, the switching element TR3 is brought into a conductive state to discharge the charges accumulated in the photoelectric conversion units PD1 and PD2 for initial reset. Next, the switching elements SW-11, SW-12, TR1, TR2, and TR3 are made non-conductive to accumulate charges corresponding to the amount of light received.

Figure 30B:
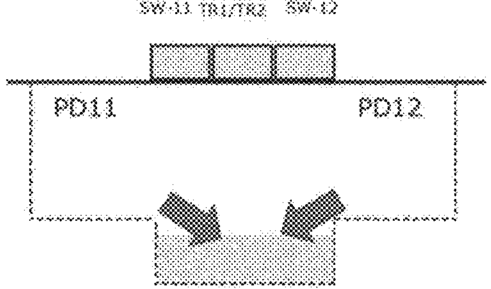
FIG. 30B is a diagram schematically illustrating a state where a switching element is brought into a conductive state.

FIG. 30B is a diagram schematically illustrating a state where the switching elements SW-11, SW-12, TR1, and TR2 are brought into a conductive state. As illustrated in FIG. 30B, the switching elements SW-11, SW-12, TR1, and TR2 are made conductive, that is, their gate signals are set to high. Accordingly the charges accumulated in the photoelectric conversion units PD11 and PD12 are transferred to the side of the switching elements SW-11, SW-12, TR1, and TR2, which is on the deeper side (larger side) of the positive potential.

Figure 30C:
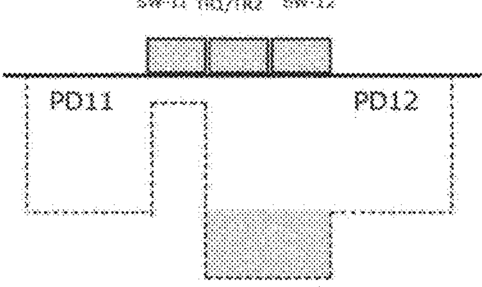
FIG. 30C is a diagram schematically illustrating a state where the switching element is brought into a non-conductive state.

FIG. 30C is a diagram schematically illustrating a state where the switching element SW-11 is brought into a non-conductive state. Next, as illustrated in FIG. 30C, when the switching element SW-11 is made non-conductive, the charges are collected on the side of the switching elements SW-12, TR1, and TR2.

Figure 30D:
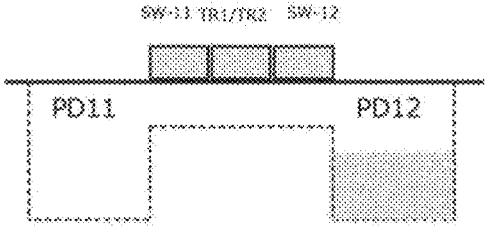
FIG. 30D is a diagram schematically illustrating a state where the switching element is brought into a non-conductive state.

FIG. 30D is a diagram schematically illustrating a state where the switching elements SW-11, SW-12, TR1, TR2, and TR3 are brought into a non-conductive state. When the switching elements SW-11, SW-12, TR1, TR2, and TR are made non-conductive, the charges, that is, the charges collected on the side of the switching elements SW-12, TR1, and TR2, are transferred to the photoelectric conversion unit PD12 side to complete the charge transfer. By repeating the processing illustrated in FIGS. 30B, 30C, and 30D, charges are transferred between pixels. Processing and others after that are the same as those of the imaging device 100 according to the third embodiment.

As described above, according to the present embodiment, in addition to the same effect as the modification example of the third embodiment, charges can be transferred using the switching element SW-11 and the switching element SW-12. As a result, it is possible to control the bias potential of the photoelectric conversion unit PD more accurately and thus to perform transfer control more accurately.

Fourth Embodiment

An imaging device 100 according to a fourth embodiment differs from the imaging device 100 according to the first embodiment in that the pixel array unit 30 is configured with color pixels and can also be driven for color pixels. Differences from the imaging device 100 according to the first embodiment will be described below.

Figure 31:
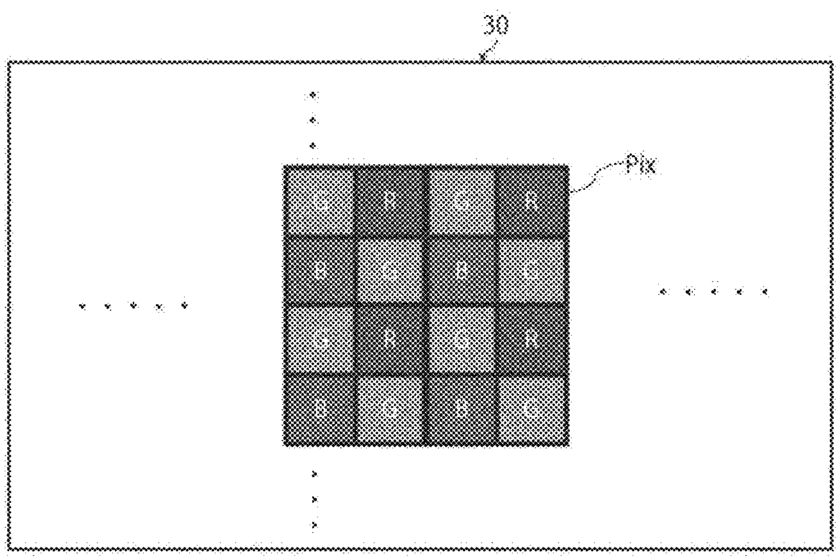
FIG. 31 is a diagram illustrating a configuration example of a pixel array unit according to a fourth embodiment.

FIG. 31 is a diagram illustrating a configuration example of the pixel array unit 30 according to the fourth embodiment. As illustrated in FIG. 31, each pixel Pix includes, for example, color filters in Baize array for red (R), green (G), and blue (B). Thus, each pixel Pix receives light through one of the plurality of color filters red (R), green (G), and blue (B).

Figure 32:
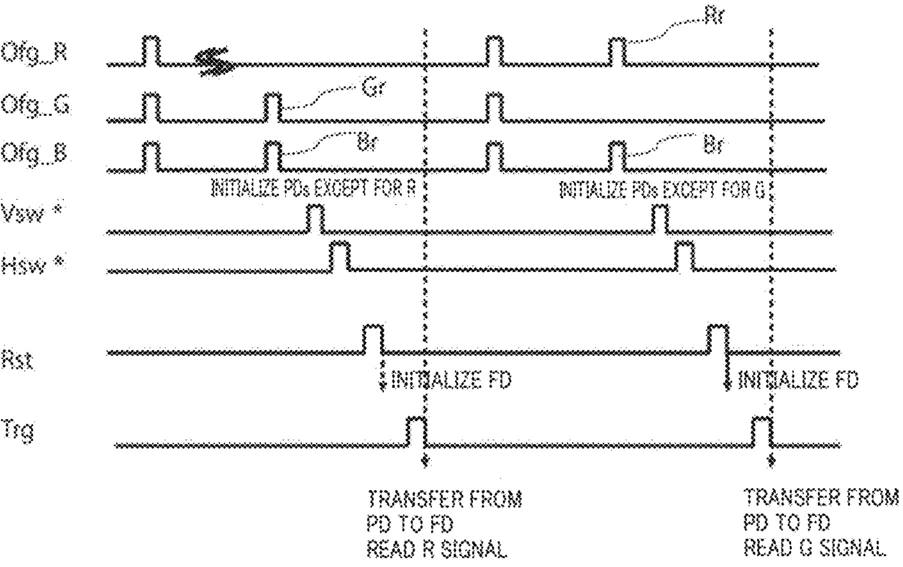
FIG. 32 is a timing chart illustrating an example of addition processing in the pixel array unit of FIG. 31.

FIG. 32 is a timing chart illustrating an example of addition processing in the pixel array unit 30 of FIG. 31. This case differs from the driving illustrated in FIGS. 26A, 26B, 26C, and 27 in that the accumulation drive for red (R) color pixels, the accumulation drive for green (G) color pixels, and the accumulation drive for blue (B) color pixels are performed in different time zones.

As illustrated in FIG. 32, according to the control of the accumulation control circuit 210, the first access control circuit 211*a*, the second access control circuit 211*b*, and the third access control circuit 211*c*, accumulation for each pixel Pix in the accumulation drive for red (R) color pixels is started with a time length proportional to the weight value wij. Then, before the charges are transferred between the photoelectric conversion units PD of the pixels Pix, the green (G) color pixels and the blue (B) color pixels are reset by reset signals Gr2 and Br2. The transfer processing after that is the same as that illustrated in FIGS. 16 and 17. In this way in the accumulation drive for red (R) color pixels, the accumulated charges for green (G) color pixels and blue (B) color pixels are discharged for reset before the transfer processing of the accumulated charges. Accordingly the accumulated charges for red (R) color pixels are transferred to the floating diffusion FD.

Similarly accumulation for each pixel Pix in the accumulation drive for green (G) color pixels is started with a time length proportional to the weight value wij. Then, before the charges are transferred between the photoelectric conversion units PD of the pixels Pix, the red (R) color pixels and the blue (B) color pixels are reset by reset signals Rr2 and Br2. The transfer processing after that is the same as that illustrated in FIGS. 26A, 26B, 26C, and 27. In this way, in the accumulation drive for green (G) color pixels, the accumulated charges for red (R) color pixels and blue (B) color pixels are discharged for reset before the transfer processing of the accumulated charges. Accordingly, the accumulated charges for green (G) color pixels are transferred to the floating diffusion FD.

Similarly accumulation for each pixel Pix in the accumulation drive for blue (B) color pixels is started with a time length proportional to the weight value wij. Then, before the charges are transferred between the photoelectric conversion units PD of the pixels Pix, the red (R) color pixels and the green (G) color pixels are reset by reset signals Rr2 and Gr2. The transfer processing after that is the same as that illustrated in FIGS. 16 and 17. In this way in the accumulation drive for blue (B) color pixels, the accumulated charges for red (R) color pixels and green (G) color pixels are discharged for reset before the transfer processing of the accumulated charges. Accordingly the accumulated charges for blue (B) color pixels are transferred to the floating diffusion FD.

As described above, in the imaging device 100 according to the third embodiment, the pixel array unit 30 includes color pixels, and enables the drive for color pixels. This makes it possible to transfer the accumulated charges for red (R) pixels, the accumulated charges for green (G) pixels, and the accumulated charges for blue (B) pixels to the floating diffusion FD, making it possible to suppress color mixture.

Fifth Embodiment

An imaging device 100 according to a fifth embodiment differs from the imaging device 100 according to the first embodiment in that driving is also possible for the weight values wij (F104) in Equation (1) having negative values. Differences from the imaging device 100 according to the first embodiment will be described below.

Figure 33:
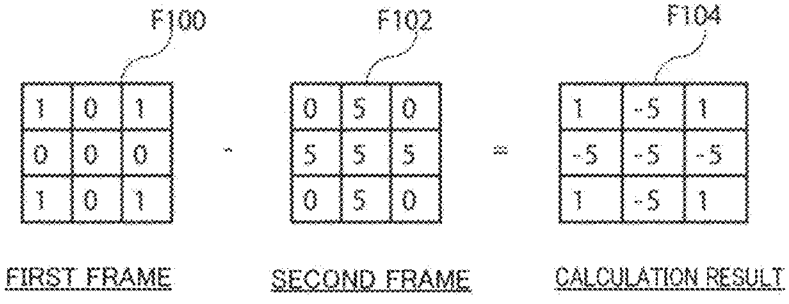
FIG. 33 is a diagram schematically illustrating an example of processing for a weight value in Equation (1), according to the fourth embodiment.

FIG. 33 is a diagram schematically illustrating an example of processing for weight values wijj (F104) in Equation (1), according to the fourth embodiment. As illustrated in FIG. 33, in a first frame F100, according to the control of the accumulation control circuit 210, the first access control circuit 211*a*, the second access control circuit 211*b*, and the third access control circuit 211*c*, accumulation for each photoelectric conversion element PD is performed for an accumulation time with a length corresponding to a weight values wij having a positive value. Then, the charges between the photoelectric conversion units PD of the pixels Pix are transferred to the floating diffusion FD. After that, the charges are converted into a first digital signal by the AD converter ADC 230 (see FIG. 5), and the first digital signal is recorded in the recording unit 120 (see FIG. 1). In this case, an accumulation time with a length corresponding to a weight value wij having a negative value is zero.

In a second frame F102, according to the control of the accumulation control circuit 210, the first access control circuit 211*a*, the second access control circuit 211*b*, and the third access control circuit 211*c*, accumulation for each photoelectric conversion element PD is performed for an accumulation time with a length corresponding to the absolute value of a weight value wij (F104) having a negative value. Then, the charges between the photoelectric conversion units PD of the pixels Pix are transferred to the floating diffusion FD. After that, the charges are converted into a second digital signal by the AD converter ADC 230 (see FIG. 5), and the second digital signal is recorded in the recording unit 120 (see FIG. 1). In this case, an accumulation time with a length corresponding to a weight value wij having a positive value is zero.

Then, the operational processing unit 142 calculates a difference between the first digital signal for the first frame F100 and the second digital signal for the second frame F102, which are recorded in the recording unit 120 (see FIG. 1), to generate a digital signal corresponding to the weight value wij (F104) in Equation (1). In this case, a calculation result corresponding to a weight value wij (F104) in Equation (1) is generated as a numerical value.

As described above, the imaging device 100 according to the fifth embodiment performs accumulation for each photoelectric conversion element PD for an accumulation time with a length corresponding to a weight value wij having a positive value, and converts the charges into a first digital signal. Subsequently each photoelectric conversion element PD performs accumulation for an accumulation time with a length corresponding to the absolute value of a weight value wij having a negative value, and converts the charges into a second digital signal. Subsequently the operational processing unit 142 subtracts the second digital signal from the first digital signal. As a result, operational processing can be driven for a weight value wij (F104) in Equation (1) having a negative value.

The present technology can have the following configurations.

(1)

A solid-state imaging element including:

- a plurality of pixel regions that include a plurality of pixels; and
- a plurality of first charge storage units corresponding to the respective pixel regions,
- wherein a plurality of first pixels in the pixel region each include a photoelectric conversion unit, and
- a first element that is brought into a conductive state or a non-conductive state with a photoelectric conversion unit of a pixel adjacent in at least one of vertical and horizontal directions, and
- a second pixel in the pixel region includes
- a photoelectric conversion unit, and
- a first element that is brought into a conductive state or a non-conductive state with a photoelectric conversion unit of a pixel adjacent to the first pixel in at least one of vertical and horizontal directions, and
- a first charge storage element that is brought into a conductive state or a non-conductive state with the first charge storage unit.

(2)

The solid-state imaging element according to (1), wherein the first element and the first charge storage element in the pixel region are brought into a first non-conductive state to start photoelectric conversion in the photoelectric conversion unit.

(3)

The solid-state imaging element according to (2), wherein after a photoelectric conversion period of the photoelectric conversion unit ends, the first element that is brought into a conductive state or a non-conductive state with another photoelectric conversion unit in the pixel region is brought into a first conductive state.

(4)

The solid-state imaging element according to (3), wherein after the first conductive state, the first charge storage element is brought into a second conductive state.

(5)

The solid-state imaging element according to (3), wherein after the first conductive state, the first element that is brought into a conductive state or a non-conductive state with the other photoelectric conversion unit in the pixel region is further brought into a second non-conductive state, and the first charge storage element is brought into a third conductive state.

(6)

The solid-state imaging element according to (1), wherein accumulated charges resulting from photoelectric conversion for each of the pixel regions are transferred through each of the first elements to the corresponding first charge storage unit.

(7)

The solid-state imaging element according to (6), wherein a positive potential of the photoelectric conversion unit on a side to which the accumulated charges are transferred is formed to be larger than a positive potential of the photoelectric conversion unit on a side which transfers the accumulated charges.

(8)

The solid-state imaging element according to (7), wherein the photoelectric conversion unit includes a photogate, and the photogate changes a magnitude of the positive potential of the photoelectric conversion unit.

(9)

The solid-state imaging element according to (6), wherein the pixel includes a potential adjustment element that is connected between the photoelectric conversion unit and the first element, and the accumulated charges are transferred by the potential adjustment element and the first element.

(10)

The solid-state imaging element according to (2), wherein a photoelectric conversion period of the photoelectric conversion unit is controlled according to a weight value of operational processing.

(11)

The solid-state imaging element according to (10), wherein the pixel further includes a second element that discharges accumulated charges of the photoelectric conversion unit, and a non-discharge period of the accumulated charges by the second element is controlled according to the weight value.

(12)

The solid-state imaging element according to (1), wherein the pixel region is changeable for the corresponding first charge storage unit.

(13)

The solid-state imaging element according to (12), wherein a range of the pixel region for the first charge storage unit is changed depending on a calculation range of operational processing.

(14)

The solid-state imaging element according to (1), wherein the plurality of pixels are arranged in a matrix, and the first element either brings a connection between the photoelectric conversion units adjacent in a first direction into a conductive state or a non-conductive state or brings a connection between the photoelectric conversion units adjacent in a second direction different from the first direction into a conductive state or a non-conductive state.

(15)

The solid-state imaging element according to (14), wherein the first element is a transfer transistor that has one end connected to the photoelectric conversion unit and is brought into a conductive state or a non-conductive state by a positive voltage control signal.

(16)

The solid-state imaging element according to (1), wherein the photoelectric conversion unit and the first element are formed in different layers.

(17)

The solid-state imaging element according to (1), wherein the first charge storage unit is a floating diffusion portion.

(18)

The solid-state imaging element according to (17), further including:

a third element that is electrically connected to the first element that is a predetermined one in the pixel region;

a fourth element that is electrically connected to the first charge storage unit;

a fifth element that is electrically connected to the third element; and a sixth element that resets charges accumulated in the first charge storage unit.

(19)

The solid-state imaging element according to (18), further including:

a second accumulation unit that accumulates accumulated charges resulting from photoelectric conversion for each pixel region; and a seventh element that electrically connects the first charge storage unit and the second accumulation unit.

(20)

The solid-state imaging element according to (19), further including an analog-to-digital conversion unit that is electrically connected to the fifth element and converts the accumulated charges resulting from photoelectric conversion for each pixel region into corresponding digital data.

(21)

The solid-state imaging element according to (20), wherein each of the pixels included in the pixel region receives light through one of a plurality of color filters, and before accumulated charges corresponding to a predetermined color filter of the plurality of color filters are transferred to the first charge storage unit, accumulated charges corresponding to another color filter of the plurality of color filters are discharged.

(22)

The solid-state imaging element according to (21), wherein the photoelectric conversion unit is made from at least one of silicon, indium gallium arsenide, and organic germanium.

(23)

The solid-state imaging element according to (22), wherein the first to sixth elements are made from at least one of silicon, an oxide semiconductor, and an organic semiconductor.

(24)

The solid-state imaging element according to (23), further including an accumulation control circuit that controls according to operational processing at least one of: reset of accumulated charges of each of the photoelectric conversion units, generation of accumulated charges according to a weight value, the pixel region, and a potential shape.

(25)

An imaging device including:

the solid-state imaging element according to (24); and an operational processing unit that is capable of performing a convolution operation, wherein the weight value and information on the pixel region corresponding to an operation range are supplied from the operational processing unit.

(26)

The imaging device according to (25), wherein the operational processing unit calculates a difference between first digital data generated by the analog-to-digital conversion unit after control of a photoelectric conversion period of the photoelectric conversion unit according to a positive weight value of the operational processing and transfer to the first charge storage unit and second digital data generated by the analog-to-digital conversion unit after control of a photoelectric conversion period of the photoelectric conversion unit according to an absolute value of a negative weight value of the operational processing and transfer to the first charge storage unit.

Aspects of the present disclosure are not limited to the aforementioned individual embodiments and include various modifications that those skilled in the art can achieve, and effects of the present disclosure are also not limited to the details described above. In other words, various additions, modifications, and partial deletion can be made without departing from the conceptual idea and spirit of the present disclosure that can be derived from the details defined in the claims and the equivalents thereof.

REFERENCE SIGNS LIST

100 Imaging device
142 Operational processing unit
200 Imaging element
210 Accumulation control circuit
A11 to A22 Addition range (pixel range)
AMP Switching element (fourth element)
FD Floating diffusion (first charge storage unit)
FD2 Floating diffusion (second charge storage unit)
FG Switching element (seventh element)
PD Photoelectric conversion unit
PD11 Photoelectric conversion unit
PD12 Photoelectric conversion unit
PD13 Photoelectric conversion unit for second pixel
PD33 Photoelectric conversion unit for second pixel
Photo Gate11 Photogate 11
Photo Gate12 Photogate 12
RST Switching element (sixth element)
SEL Switching element (fifth element)
SW-11 Switching element
SW-12 Switching element
TR1 Switching element (first element)
TR2 Switching element (first element)
TR3 Switching element (second element)
TRG Switching element (third element)

The invention claimed is:

1. A solid-state imaging element, comprising:

a plurality of pixel regions; and a plurality of charge storage units, wherein each charge storage unit in the plurality of charge storage units corresponds to a respective pixel region of the plurality of pixel regions, a pixel region of the plurality of pixel regions includes a plurality of pixels in a matrix, the plurality of pixels comprises a plurality of first pixels, and a second pixel, each first pixel of the plurality of first pixels in the pixel region comprises:

a photoelectric conversion unit; and a first element, the second pixel in the pixel region includes:

the photoelectric conversion unit;

the first element; and a first charge storage element that is in one of conductive state or a non-conductive state with a charge storage unit of the plurality of charge storage units, the first element in each pixel of the plurality of pixels either brings a connection between photoelectric conversion units in respective adjacent pixels adjacent in a first direction in the plurality of pixels, into one of the conductive state or the non-conductive state, or brings a connection between photoelectric conversion units in respective adjacent pixels adjacent in a second direction in the plurality of pixels, into one of the conductive state or the non-conductive state, and the first direction is different from the second direction.

2. The solid-state imaging element according to claim 1, wherein the first element in the each pixel in the pixel region and the first charge storage element in the pixel region are in the non-conductive state to start photoelectric conversion in the photoelectric conversion unit in the each pixel in the pixel region.

3. The solid-state imaging element according to claim 2, wherein, subsequent to a photoelectric conversion period of the photoelectric conversion unit of a pixel of the plurality of first pixels, the first element of the pixel is in the conductive state with the photoelectric conversion unit of an adjacent pixel of the plurality of first pixels in the pixel region.

4. The solid-state imaging element according to claim 3, wherein subsequent to the conductive state of the pixel of the plurality of first pixels, the first charge storage element is in the conductive state.

5. The solid-state imaging element according to claim 3, wherein subsequent to the conductive state of the pixel of the plurality of first pixels, the first element of the second pixel is in the non-conductive state, and the first charge storage element is in the conductive state.

6. The solid-state imaging element according to claim 1, wherein accumulated charges from photoelectric conversion for each pixel region of the plurality of pixel regions are transferred through the first element of the second pixel to the charge storage unit of the plurality of charge storage units.

7. The solid-state imaging element according to claim 6, wherein a positive potential of the photoelectric conversion unit, in the pixel region, on a side to which the accumulated charges are transferred is larger than a positive potential of the photoelectric conversion unit, in the pixel region, on a side which transfers the accumulated charges.

8. The solid-state imaging element according to claim 7, wherein the photoelectric conversion unit includes a photogate, and the photogate is configured to change a magnitude of the positive potential of the photoelectric conversion unit.

9. The solid-state imaging element according to claim 6, wherein a pixel of the plurality of pixels includes a potential adjustment element that is connected between the photoelectric conversion unit of the pixel and the first element of the pixel, and the accumulated charges from the pixel are transferred by the potential adjustment element of the pixel and the first element of the pixel.

10. The solid-state imaging element according to claim 1, wherein a photoelectric conversion period of the photoelectric conversion unit of a pixel of the plurality of pixels is controlled based on a weight value of the pixel of the plurality of pixels.

11. The solid-state imaging element according to claim 10, wherein the pixel further includes a second element configured to discharge accumulated charges of the photoelectric conversion unit in the pixel, and a non-discharge period of the accumulated charges by the second element is based on the weight value.

12. The solid-state imaging element according to claim 1, wherein the pixel region is changeable for the charge storage unit.

13. The solid-state imaging element according to claim 12, wherein a range of the pixel region for the charge storage unit is based on a calculation range of an operational process.

14. The solid-state imaging element according to claim 1, wherein the first element of a pixel of the plurality of pixels is a transfer transistor that has one end connected to the photoelectric conversion unit of the pixel, and the first element is in one of the conductive state or the non-conductive state by a positive voltage control signal.

15. The solid-state imaging element according to claim 1, wherein the photoelectric conversion unit of a pixel of the plurality of pixels and the first element of the pixel of the plurality of pixels are in different layers of the solid-state imaging element.

16. The solid-state imaging element according to claim 1, wherein the charge storage unit is a floating diffusion portion.

17. The solid-state imaging element according to claim 16, wherein the pixel region of the plurality of pixel regions further comprises:

a third element that is electrically connected to the first element of the second pixel;

a fourth element that is electrically connected to the charge storage unit;

a fifth element that is electrically connected to the third element; and a sixth element configured to reset charges accumulated in the charge storage unit.

18. The solid-state imaging element according to claim 17, further comprising:

a second accumulation unit configured to accumulate accumulated charges from photoelectric conversion for each pixel region of the plurality of pixel regions; and a seventh element configured to electrically connect the charge storage unit and the second accumulation unit.

19. The solid-state imaging element according to claim 18, further comprising an analog-to-digital conversion unit that is electrically connected to the fifth element, wherein the analog-to-digital conversion unit is configured to convert the accumulated charges from the photoelectric conversion for the each pixel region of the plurality of pixel regions into corresponding digital data.

20. The solid-state imaging element according to claim 19, wherein each of the plurality of first pixels included in the pixel region is configured to receive light through one of a plurality of color filters, and the pixel region is configured to discharge first accumulated charges corresponding to a first color filter of the plurality of color filters, prior to second accumulated charges corresponding to a second color filter of the plurality of color filters are transferred to the first charge storage unit.

21. The solid-state imaging element according to claim 20, wherein the photoelectric conversion unit comprises at least one of silicon, indium gallium arsenide, or organic germanium.

22. The solid-state imaging element according to claim 21, wherein the pixel further includes a second element connected to the photoelectric conversion unit in the pixel, each of the first element, the second element, the third element, the fourth element, the fifth element, and the sixth element comprises at least one of silicon, an oxide semiconductor, or an organic semiconductor.

23. The solid-state imaging element according to claim 22, further comprising an accumulation control circuit configured to control, based on a potential shape of the photoelectric conversion unit of the pixel, at least one of reset of accumulated charges of the photoelectric conversion unit of the pixel, or generation of accumulated charges of the photoelectric conversion unit of the pixel.

24. An imaging device, comprising:

the solid-state imaging element according to claim 23; and an operational processing unit configured to execute a convolution operation, wherein a weight value of each pixel of the plurality of pixels and information on the pixel region corresponding to an operation range are supplied from the operational processing unit.

25. The imaging device according to claim 24, wherein the operational processing unit is further configured to calculate a difference between first digital data and second digital data, the analog-to-digital conversion unit is further configured to:

generate, subsequent to a photoelectric conversion period of the photoelectric conversion unit, the first digital data based on a positive weight value of an operational process;

transfer the generated first digital data to the charge storage unit;

generate, subsequent to the photoelectric conversion period of the photoelectric conversion unit, the second digital data based on an absolute value of a negative weight value of the operational process; and transfer the generated second digital data to the charge storage unit.

* * * * *